(12) United States Patent
Saifutdinov et al.

(10) Patent No.: US 7,588,666 B2
(45) Date of Patent: Sep. 15, 2009

(54) COMPACT RECTIFYING UNIT FOR SEPARATION OF MIXED FLUIDS AND RECTIFYING PROCESS FOR SEPARATION OF SUCH MIXED FLUIDS

(75) Inventors: Albert Faritovich Saifutdinov, Novosibirsk (RU); Oleg Yegorovich Beketov, Novosibirsk (RU); Viktor Seliverstovich Ladoshkin, Novosibirsk (RU); Guennadi Anatolievich Nesterov, Brooklyn, NY (US); Anatoly Semenovich Tlousty, Novosibirsk (RU); Guennady Ivanovich Ivanov, Angarsk (RU)

(73) Assignees: A. Saifutdinov (RU); O. Beketov (RU); V. Lasoshkin (RU); G. Nesterov, Brooklyn, NY (US)

( * ) Notice: Subject to any disclaimer, the term of this patent is extended or adjusted under 35 U.S.C. 154(b) by 603 days.

(21) Appl. No.: 10/508,265

(22) PCT Filed: Mar. 20, 2002

(86) PCT No.: PCT/RU02/00106

§ 371 (c)(1),
(2), (4) Date: Sep. 17, 2004

(87) PCT Pub. No.: WO03/078014

PCT Pub. Date: Sep. 25, 2003

(65) Prior Publication Data
US 2005/0224333 A1    Oct. 13, 2005

(51) Int. Cl.
*B01D 1/06* (2006.01)
*B01D 3/04* (2006.01)
*F28F 1/00* (2006.01)
*F28F 13/14* (2006.01)

(52) U.S. Cl. .............. 203/1; 138/38; 165/177; 159/27.1; 159/27.3; 159/44; 159/47.1; 202/160; 202/237; 203/100

(58) Field of Classification Search ............... 159/26.1, 159/27.1, 27.3, 28.6, 37, 38, 44, 47.1; 202/153, 202/158, 160, 237; 203/1, 2, 93, 98, 100; 165/136, 145, 146, 177, 910; 138/38
See application file for complete search history.

(56) References Cited

U.S. PATENT DOCUMENTS

| 3,530,923 | A |   | 9/1970 | Mattern |
| 3,739,841 | A | * | 6/1973 | Small et al. ................. 165/146 |
| 4,333,822 | A | * | 6/1982 | Tkac et al. .................. 208/184 |
| 4,372,818 | A | * | 2/1983 | Kaganovsy et al. .......... 202/83 |

(Continued)

FOREIGN PATENT DOCUMENTS

DE        372207        11/1919

(Continued)

*Primary Examiner*—Virginia Manoharan
(74) *Attorney, Agent, or Firm*—Fay Sharpe LLP

(57) ABSTRACT

The invention relates to a compact rectifying unit for separation of mixed fluids using for heat transfer purpose a fluid heat carrier and its vapours on one of the sides of heat and mass exchanging walls. In order to increase the efficiency of the heat and mass exchange process, the heat and mass exchange tubes of the rectifying part and/or of the evaporator part have means to provide irregular/varying amounts of heat transfer between the inside and the outside of tube wall along the height of the heat and mass exchange tubes. This allows for a reduction in the rectification column height by 3-10 times.

34 Claims, 19 Drawing Sheets

U.S. PATENT DOCUMENTS

| | | | |
|---|---|---|---|
| 4,439,533 A * | 3/1984 | Lomas et al. | 502/6 |
| 5,341,649 A * | 8/1994 | Nevitt et al. | 62/126 |
| 5,540,899 A * | 7/1996 | Koves | 422/200 |
| 5,762,887 A * | 6/1998 | Girod et al. | 422/200 |
| 6,286,588 B1 * | 9/2001 | Uehara | 165/146 |
| 7,163,052 B2 * | 1/2007 | Taras et al. | 165/146 |
| 7,306,029 B2 * | 12/2007 | Dobos | 165/163 |

FOREIGN PATENT DOCUMENTS

| | | |
|---|---|---|
| DE | 37 06 645 A1 | 9/1988 |
| GB | 279526 | 10/1927 |
| GB | 588214 | 5/1947 |

* cited by examiner

View I a) b) c)

COMPACT RECTIFYING UNIT FOR SEPARATION OF MIXED FLUIDS AND RECTIFYING PROCESS FOR SEPARATION OF SUCH MIXED FLUIDS

CROSS-REFERENCE TO RELATED APPLICATIONS

This application is the U.S. National Phase of PCT International Application No. PCT/RU02/00106 having an international filing date of Mar. 20, 2002.

FIELD OF INVENTION

The invention relates to a compact rectifying unit for separation of mixed fluids according of the preamble of claim 1, a compact evaporation unit for a rectifying unit according to the preamble of claim 33 as well as to a rectifying process for separation of mixed fluids according to the preamble of claim 34.

BACKGROUND OF INVENTION

Operation of a traditional rectifying column, including a film column, consists in that the wet reflux flow made in a refluxer out of the heat and mass exchange zone between steam and liquid, is brought to the top of the column. Thus, as shown in FIG. 1, the vapor flow G and liquid reflux flow L is constant on all height levels of a column. The flow of the liquid reflux flow L usually considerably exceeds the flow of a distillate sampling P.

SUMMARY OF INVENTION

Referring to FIG. 2, in a film column like the invented one the liquid reflux flow L is formed directly on all height levels of the heat and mass exchange zone. The liquid reflux flow is obtained by creation of the temperature gradient through a heat exchanging wall at each height level of the column and it flows down along the heat exchanging wall as a thin film. Thus the terms are conditioned for forced condensation of vapors G1 at the height of idealized stage of separation $h_1$. During condensation of vapors G1 in this point there is a simultaneous formation of a liquid reflux flow L1, enriched by nonvolatile components of a mixture, and formation of a secondary vapor flow G2, enriched by light components of a mixture. This process is repeated along the column height, until the required distillate concentration on light components of the base mix will be reached.

The object of the subject invention is to increase the efficiency of the heat and mass exchange process. This object is achieved by a compact rectifying unit and/or by a compact evaporation unit for a rectifying unit and/or by a process or processes for all of same.

According to the subject invention, along the column height there is an irregular gradient of temperature between both sides of the heat exchanging tube wall. Thus there is an irregular heat energy transfer through the heat exchanging tube wall and/or between vapor phase and liquid phase at at least one of the sides of the heat exchanging tube wall one of the consequences may be an irregular liquid reflux formation along the column height that matches to the properties of a distilled liquid.

The heat excess discharging during the liquid reflux formation is let out through the wall of the heat and mass exchange surface at the expense of the heat collection by an external boiling heat carrier which is within the space on the opposite side of said wall of said heat and mass exchange surface.

The subject invention allows to obtain low values of height of the idealized stage of separation in a film column at high loads of the column of a vapor flow, commensurable with loads for industrial packed columns. In the practical application this allows to reduce the rectification column height by 3-10 times and to reduce the content of dividing materials in the column compared to traditional rectification columns by 50-100 times.

It is to be understood, that the heat transport through the heat and mass exchanging tube walls may vary widely along the height of the column and the heat and mass exchanging tubes respectively. While it is preferred to evaporate or to condensate the components of the mixed fluids on the inside or the heat and mass exchanging tubes and to provide a heat carrier fluid within the tubular annulus around said heat and mass exchanging tubes, it is—in principal—possible and within the scope of this invention to evaporate and/or condensate said mixed fluid on the outside of said heat and mass exchanging tube/s and to conduct the heat carrier fluid through the tubular inside.

Further, it is important to mention, that for the purpose of the subject invention heat exchange does not only happen between both sides of the heat and mass exchange tube walls. Heat exchange can also happen between the mixed components and/or between vapor phase and liquid phase of the mixed fluids.

Finally it is important to mention, that mass exchange of the components of the mixed fluids may happen either within the vaporous core stream, i.e. at some distance from the surfaces of the heat and mass exchanging tube walls, and/or mass exchange between the components of the mixed fluids may occur between the vapor phase and the liquid thin fluid film on the surface of said heat and mass exchange tube walls.

One of the particular advantages of the current invention is, that it provides a highly efficient rectification of a very wide, nearly unlimited range of mixed fluids. Particularly, it is not necessary, that the boiling temperature and the energy of condensation and evaporation or the components of the mixed fluids which are to be separated do correlate with each other. Particularly, the use of a heat carrier fluid which is itself a mixed fluid which is operated between vaporous and liquid phase does provide a highly efficient remedy to vary the heat transfer between both sides of the heat and mass exchange tube walls in a very wide range along the height of said heat and mass exchange tubes. While the temperature of the heat and mass exchange tube walls may be constant along their height, this temperature will preferably vary widely along the height of the heat and mass exchange tubes in order to support the formation of the irregular heat transfer profile along the heat and mass exchange tubes height. Also the formation of a particular reflux profile along the height of the heat and mass exchange tubes, which reflux will preferably be irregular, i.e. not constant along the height of the heat and mass exchange tubes, will stabilize the equilibrium between vapors and liquid at each distillation stage, i.e. at various height levels of the heat and mass exchange tube.

SHORT DESCRIPTION OF THE FIGURES

Figure 1:
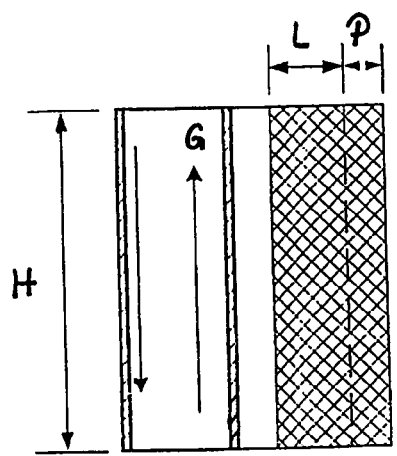
FIG. 1 shows a traditional system in which the vapor flow G and liquid reflux flow L is constant on all height levels of a column.
Figure 2:
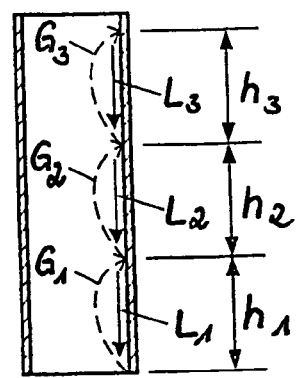
FIG. 2 shows a film column in which liquid reflux flow L is formed directly on all height levels of the heat and mass exchange zone, by creation of the temperature gradient through a heat exchanging wall at each height level of the column, and it flows down along the heat exchanging wall as a thin film.
Figure 3:
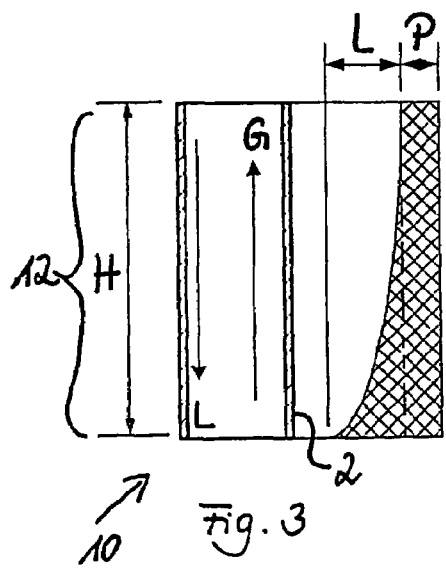

In FIG. 3 there is shown the irregular liquid reflux formation L for the rectifying part 12 of a column 13 due to an irregular heat transfer along the height H of a heat and mass exchanging tube 2 with a decreasing gradient (from bottom to top) of temperatures.

Figure 4:
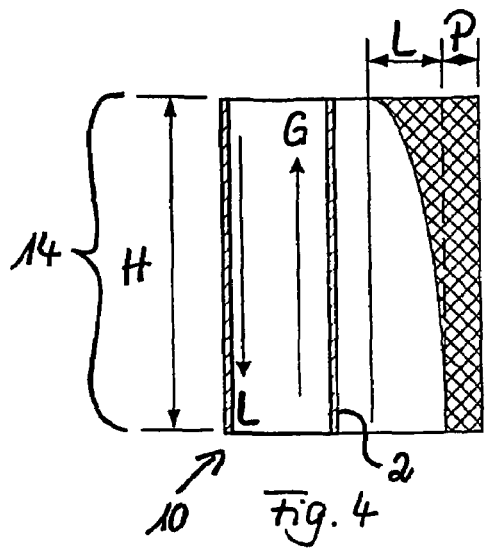

In FIG. 4 there is shown the irregular liquid reflux formation for a stripping part 14 of a column 13 due to an irregular heat transfer along the height H of a heat and mass exchanging tube 2 with a uniformly increasing gradient (from bottom to top) of temperatures.

Figure 5:
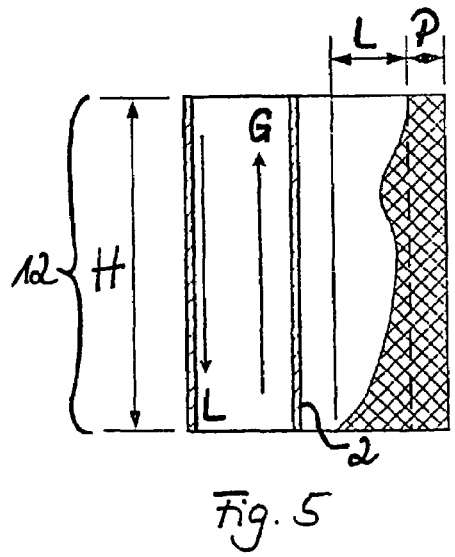

In FIG. 5 there is shown an other irregular liquid reflux formation L for the rectifying part 12 of a column 13 due to an irregular heat transfer along the height H of a heat and mass exchanging tube 2 with a nonuniformly decreasing gradient (from bottom to top) of temperatures.

Figure 6:
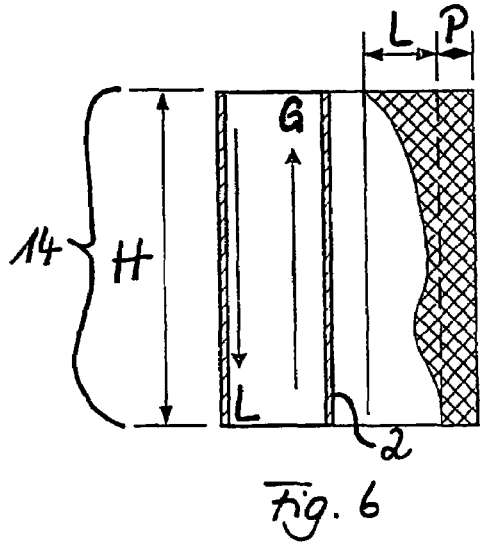

In FIG. 6 there is shown another irregular liquid reflux formation L for the stripping part 14 of a column 13 due to an irregular heat transfer along the height H of a heat and mass exchanging tube 2 with a nonuniformly increasing gradient (from bottom to top) of temperatures.

Figure 7:
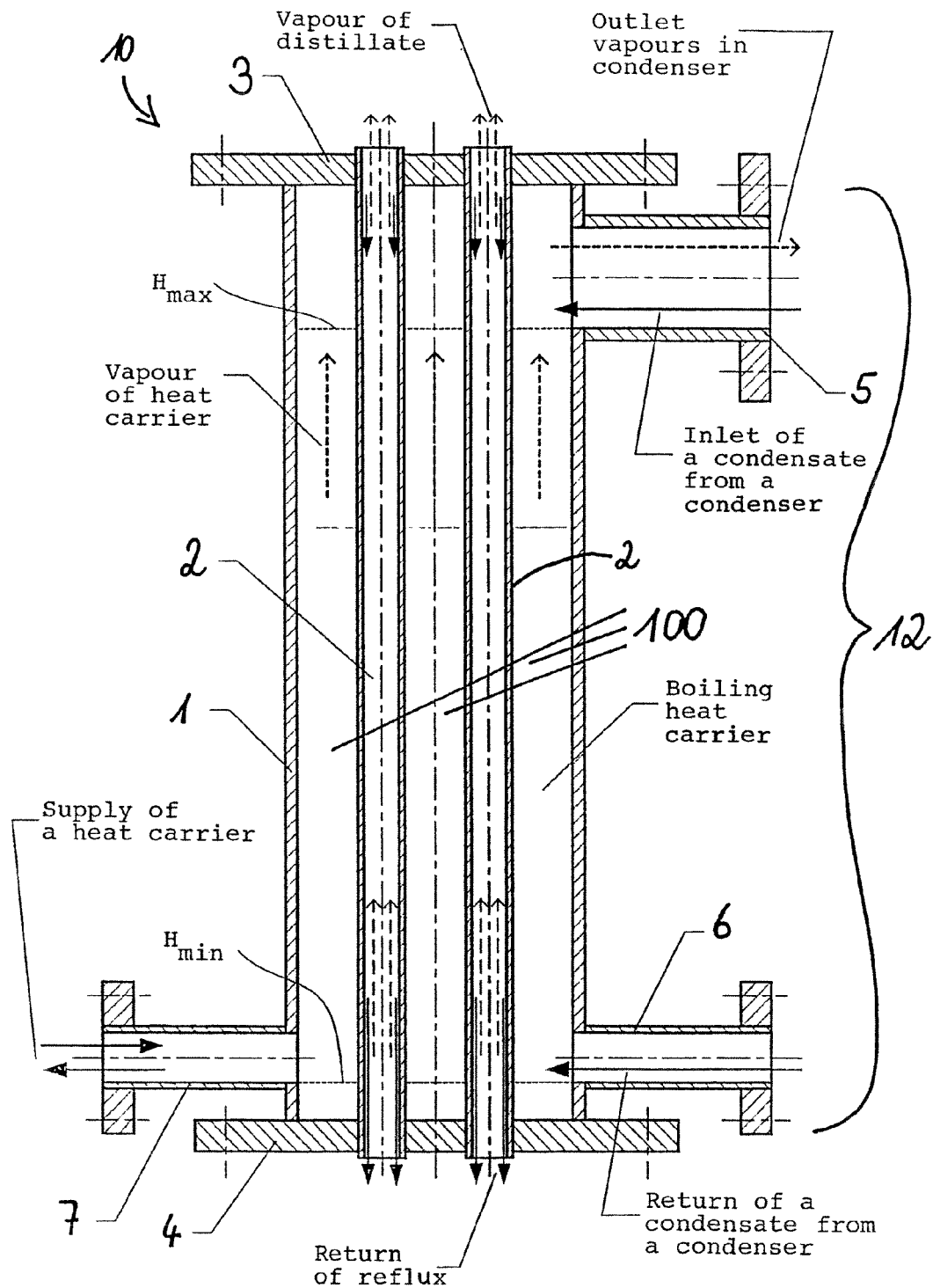

In FIG. 7, there is shown the design of the rectifying column 10 providing an irregular heat transfer and irregular reflux formation along the height of a heat and mass exchange tube 2

Figure 8:
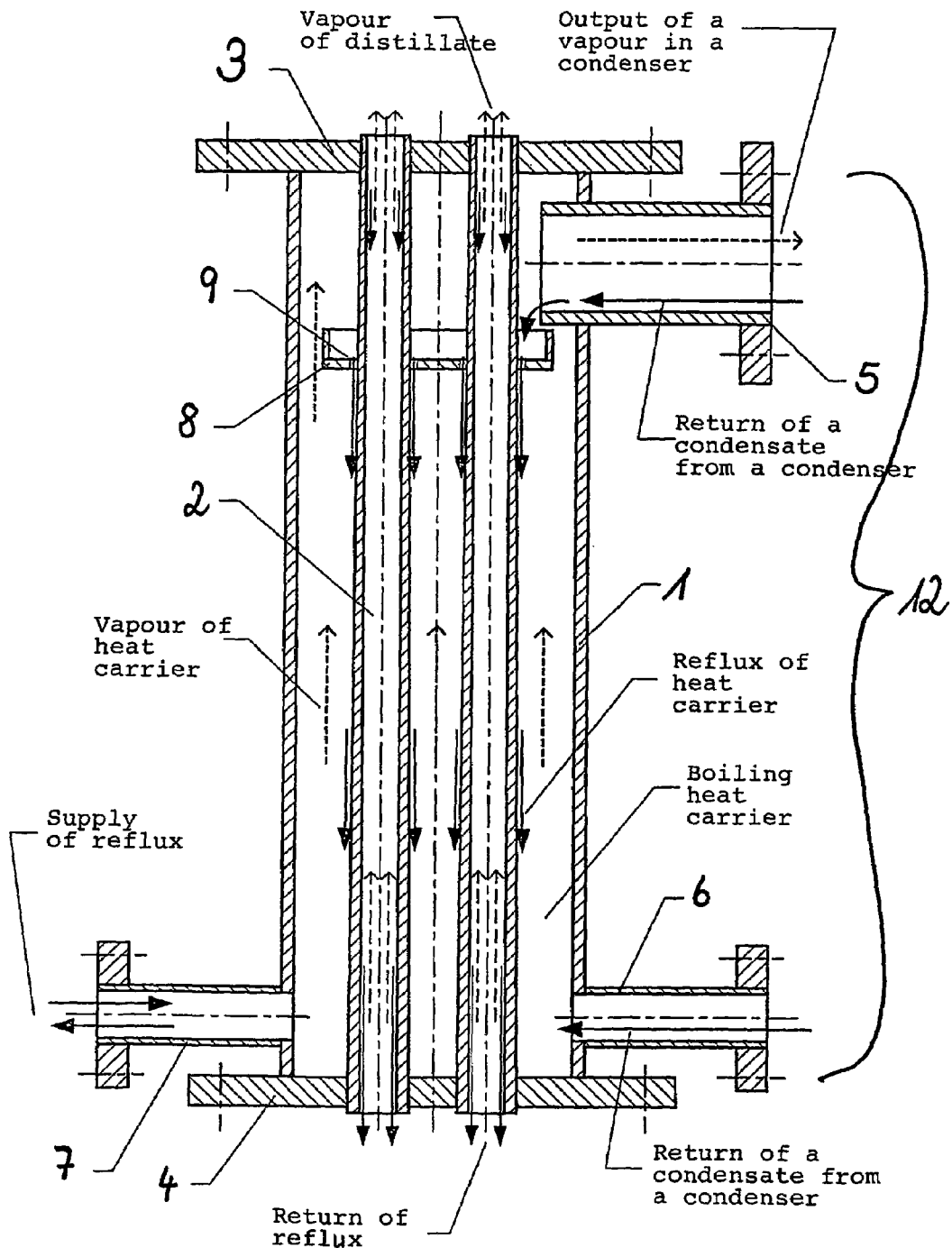

In FIG. 8 the design of a second version of a column (rectifying part) is shown.

Figure 9:
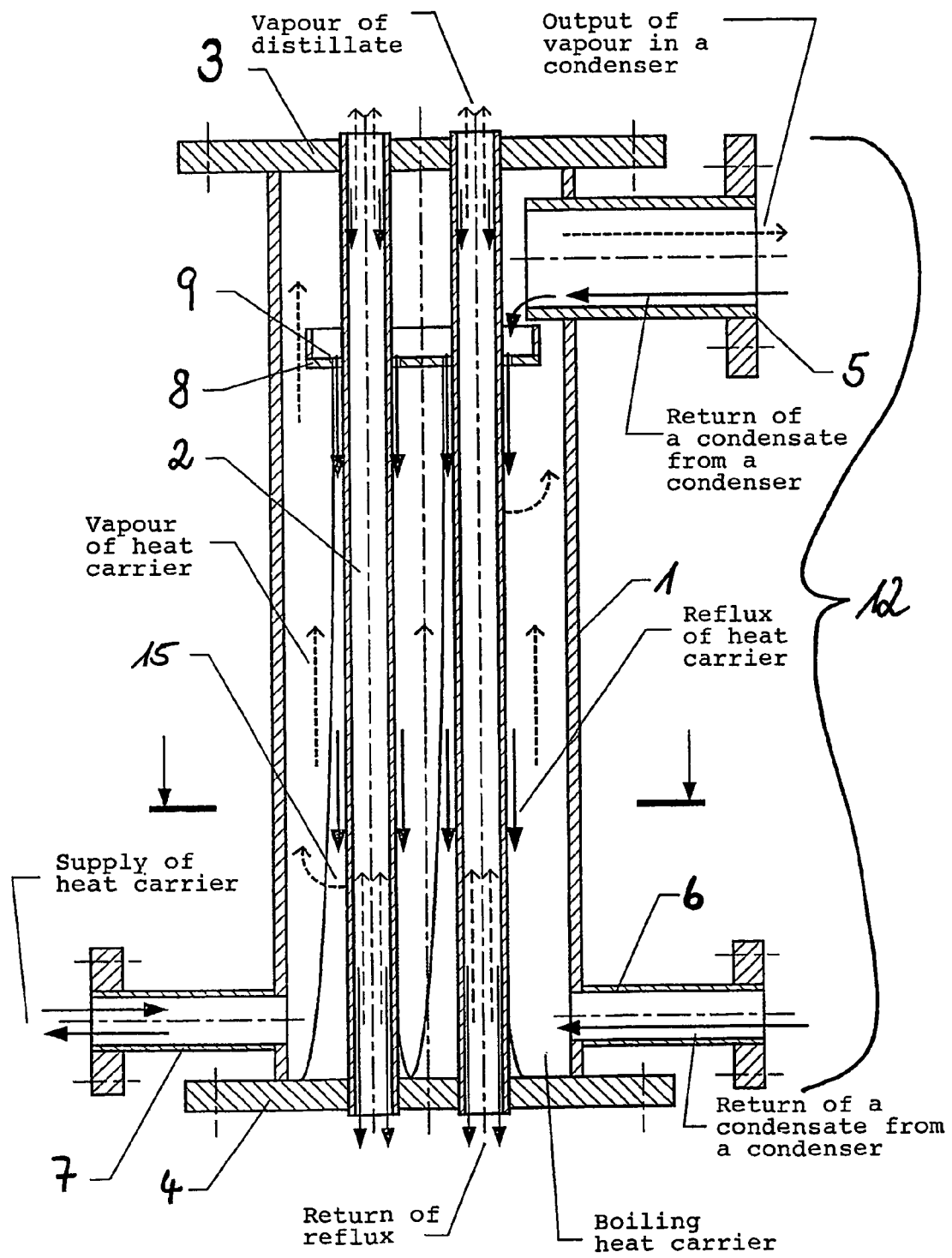
Figure 9A:
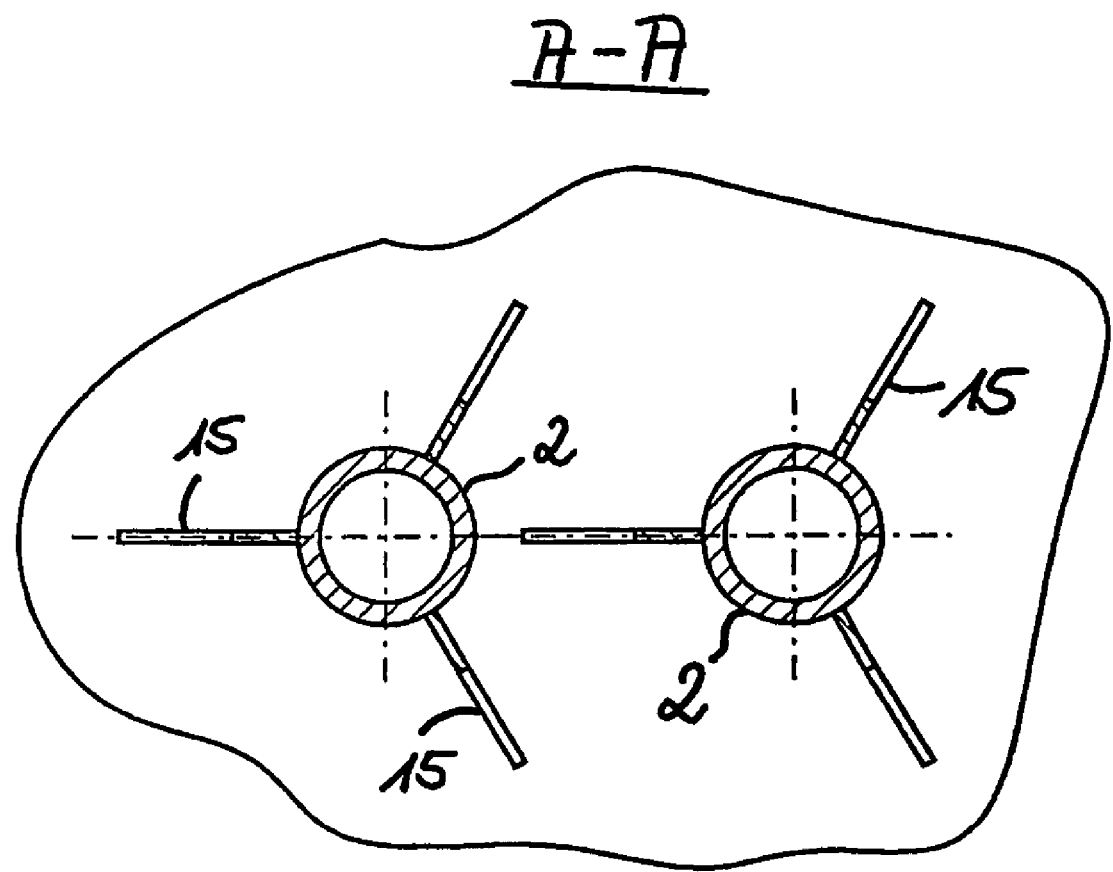

In FIGS. 9, 9a there is shown a third version of a column (rectifying part).

Figure 10:
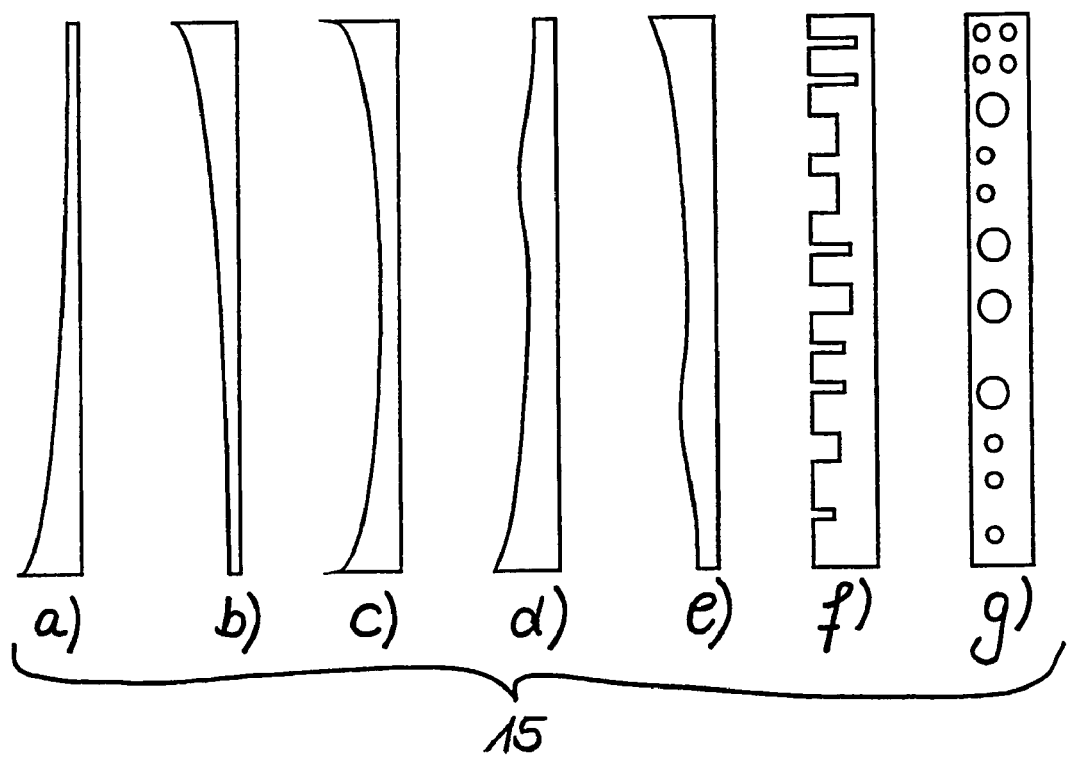

In FIG. 10 are shown some examples for irregular profiles of ribs being placed along the outer surface of heat and mass exchange tubes.

Figure 11:
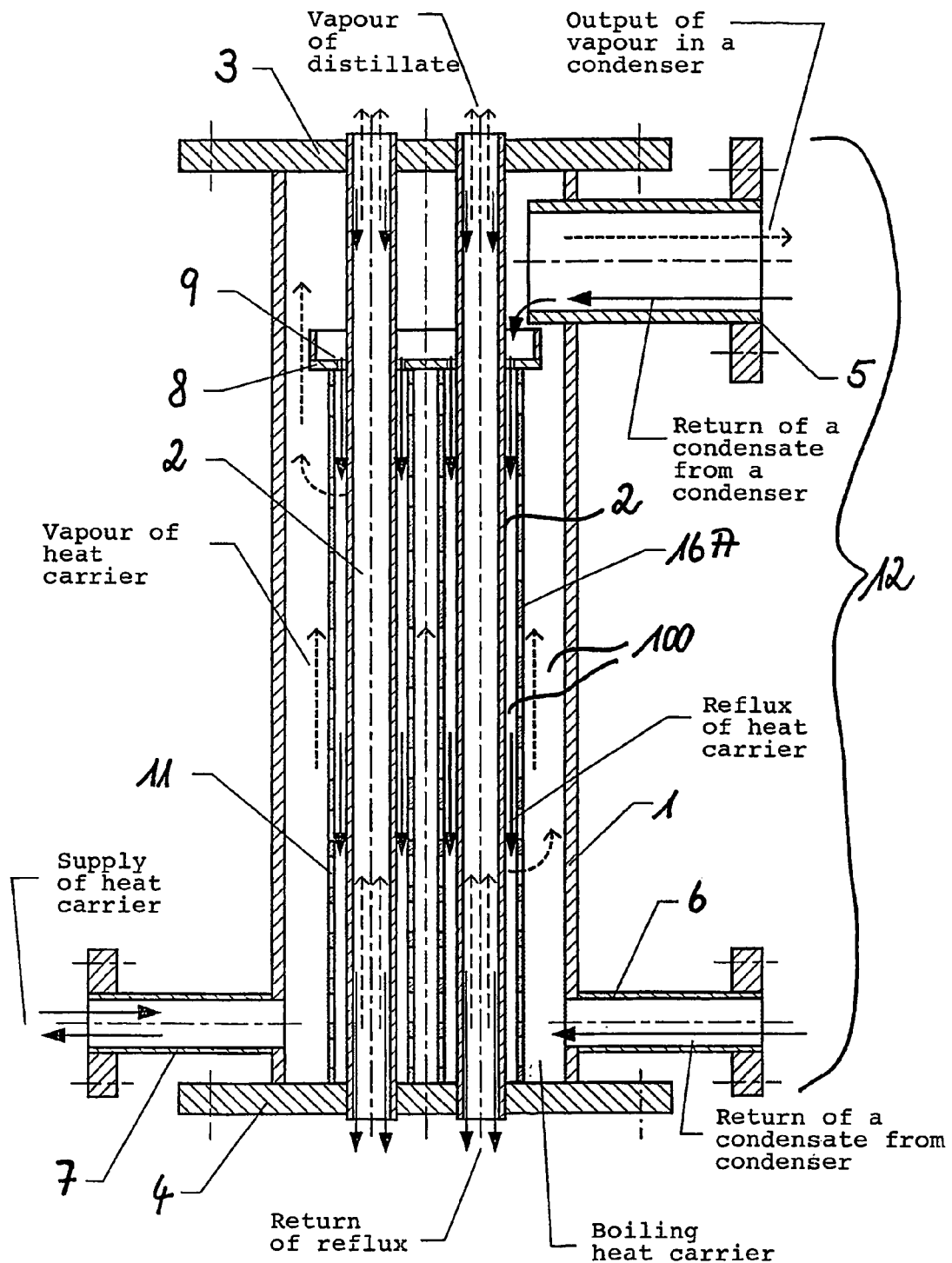

In FIG. 11 the design of a fourth version of a column (rectifying part) is shown.

Figure 12:
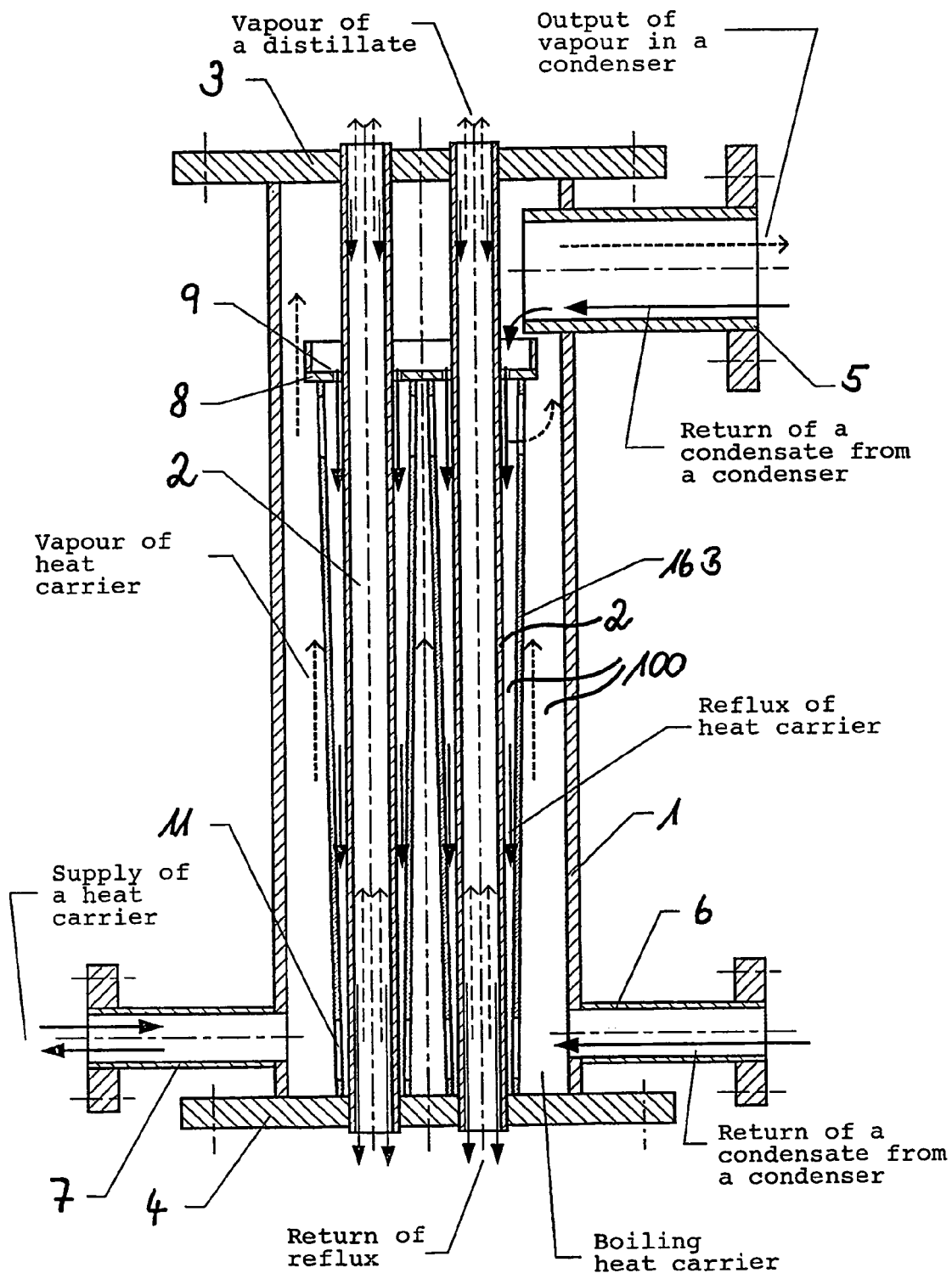

In FIG. 12 the design of a fifth version of a column (rectifying part) is shown.

Figure 13:
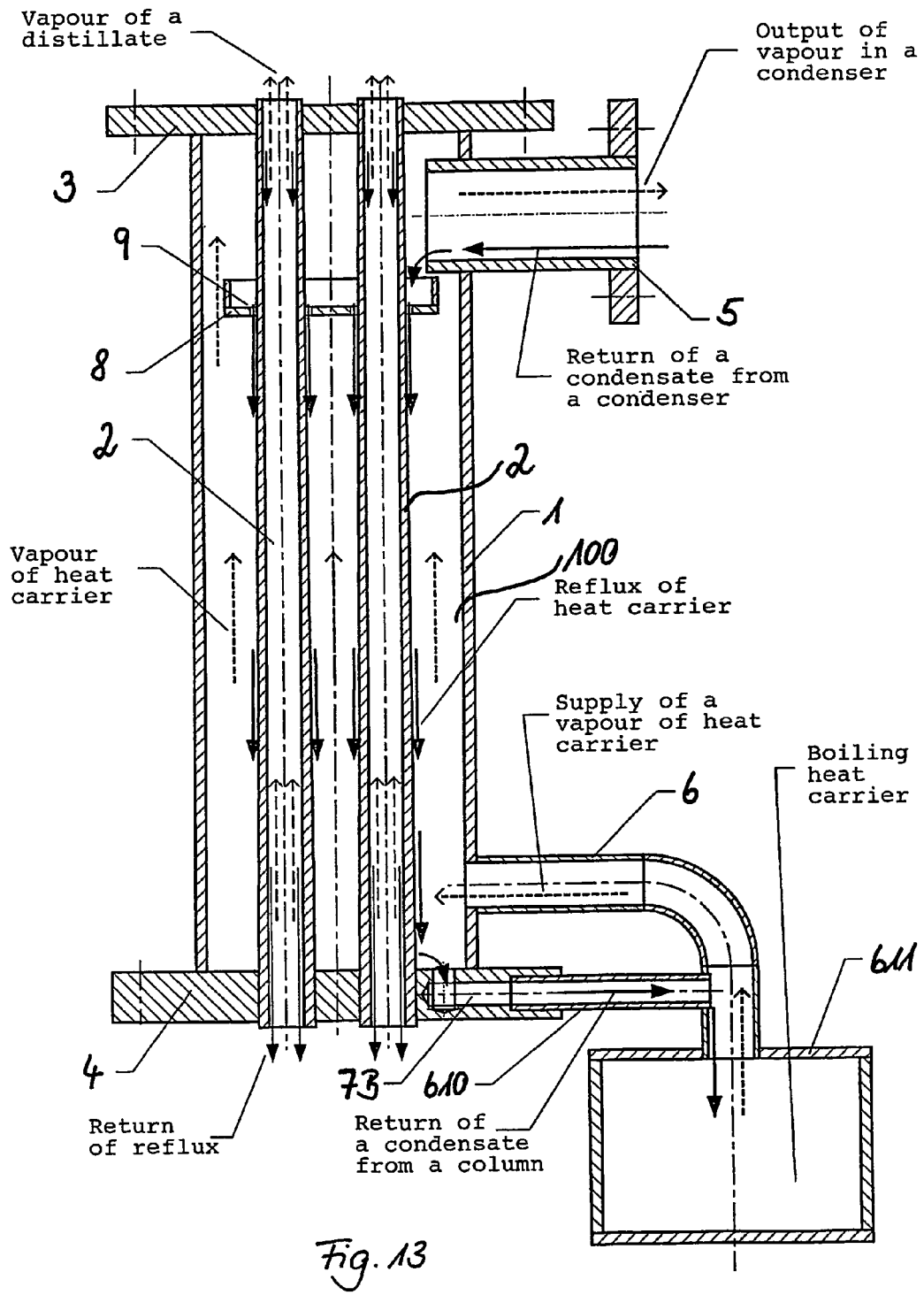

In FIG. 13 a sixth alternative version of a column (rectifying part) is shown.

Figure 14:
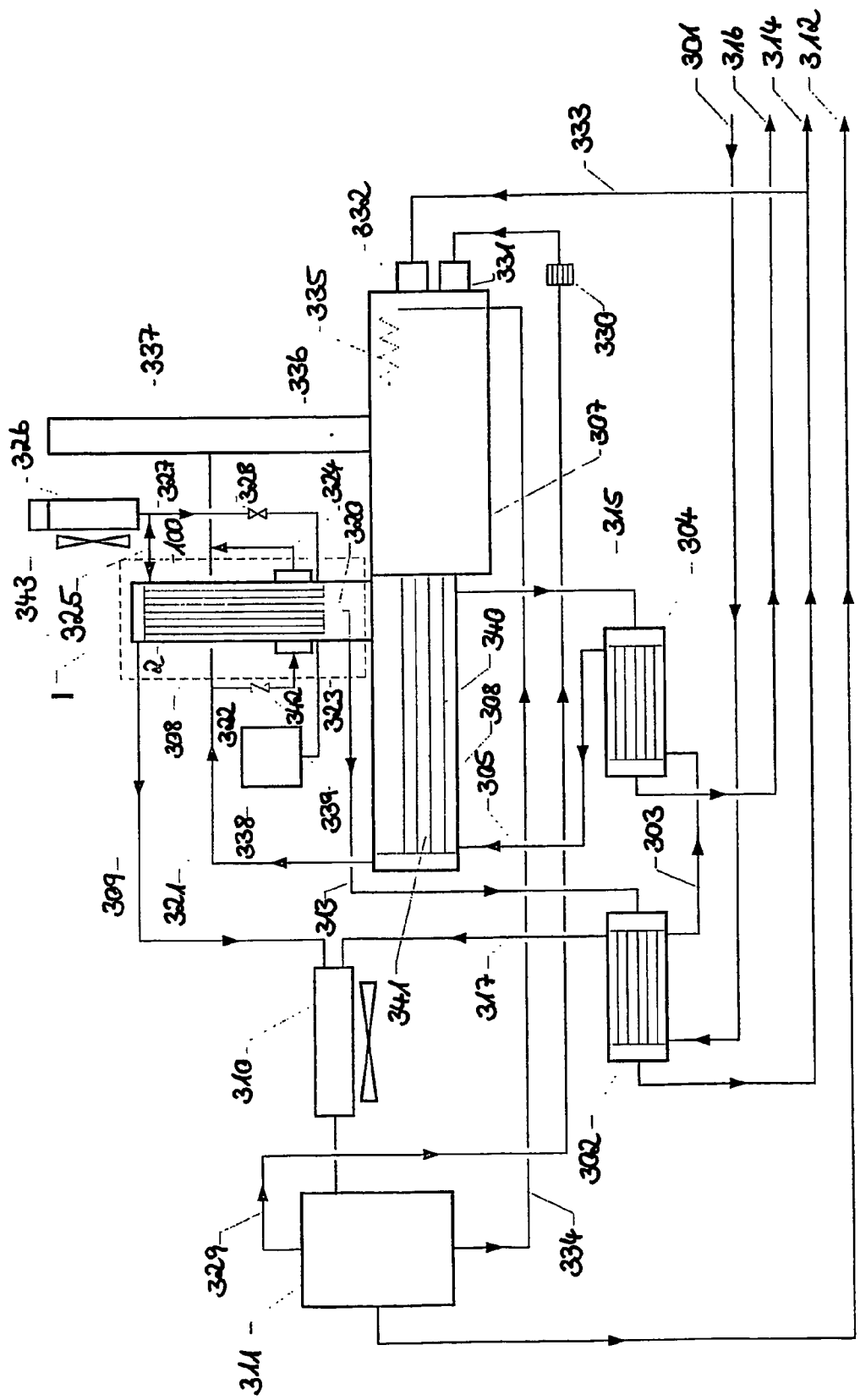

In FIG. 14 a process flow diagram of a column is shown, which one is made on the basis of the earlier described designs of a film column.

Figure 14A:
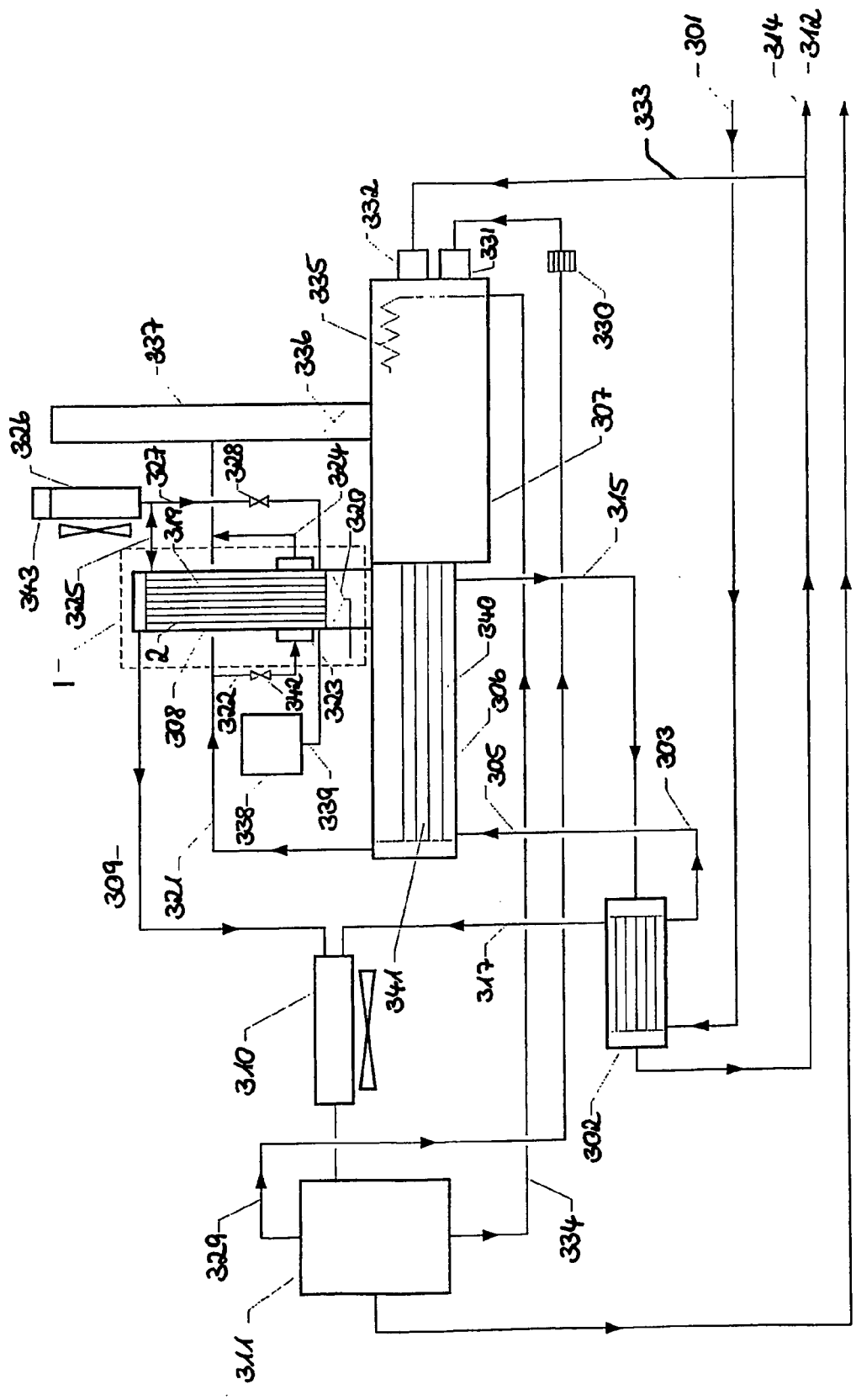

In FIG. 14a, the column scheme of distillation of a gas condensate of Verkh-Tatarskoye field, Western Siberia is shown.

Figure 15:
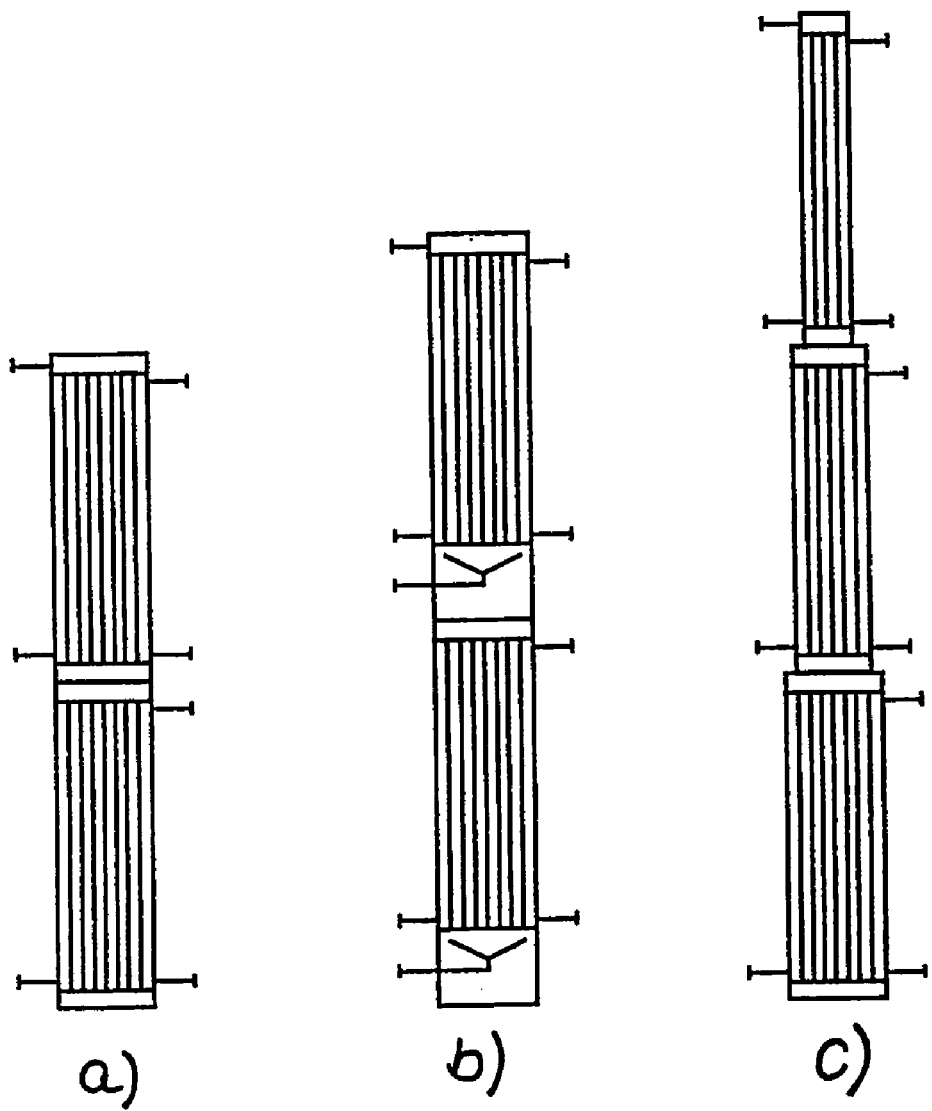

In FIG. 15 the design versions of the rectification column 8 (view I, FIGS. 14, 14a) are shown.

Figure 16:
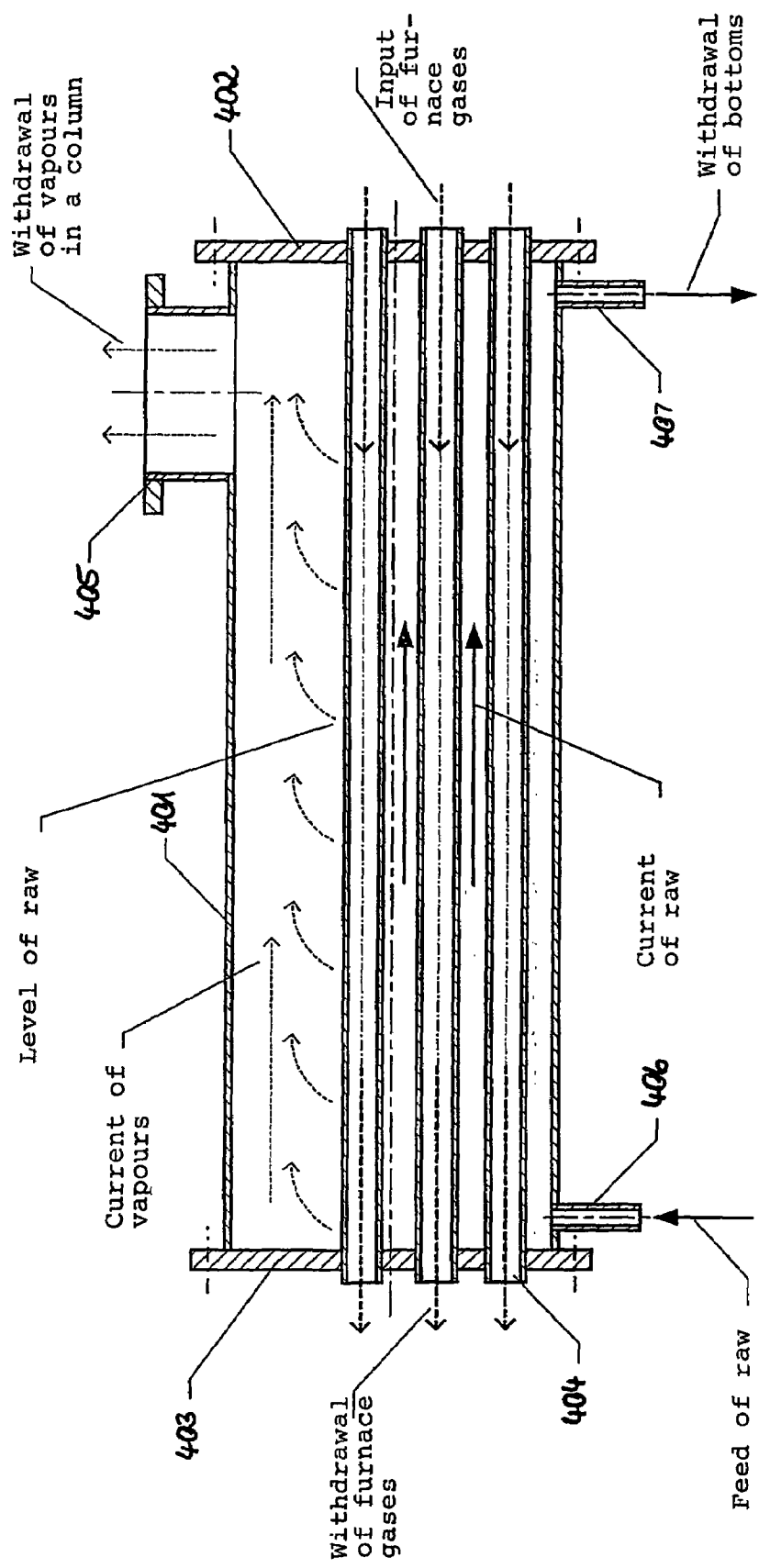

In FIG. 16 an evaporator for the columns shown in FIGS. 14, 14a is shown.

Figure 17:
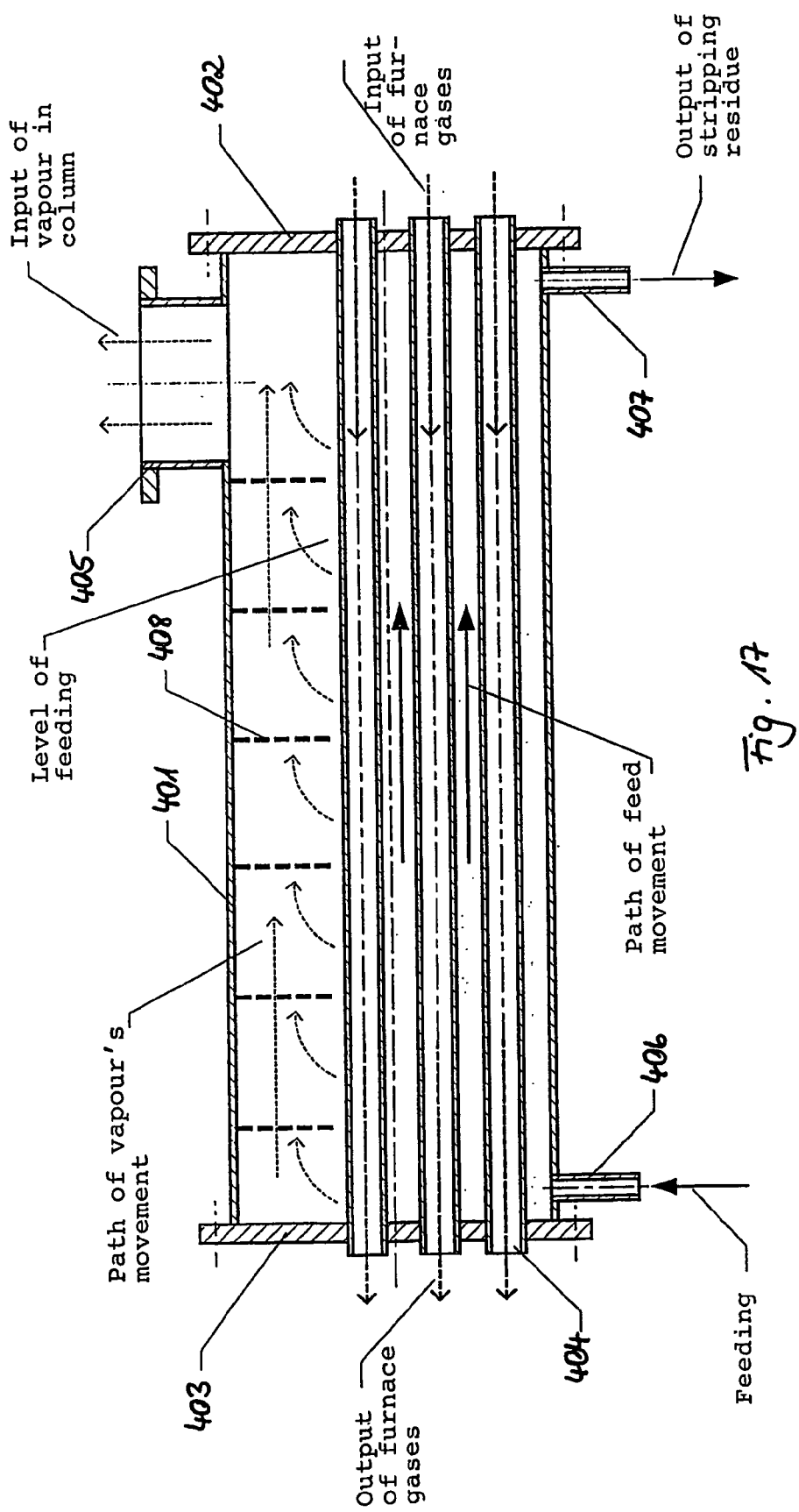

In FIG. 17 the design version of the evaporator differing by the introducing of the cross-sectional perforated partitions 408 into the vapor space is shown.

Figure 18:
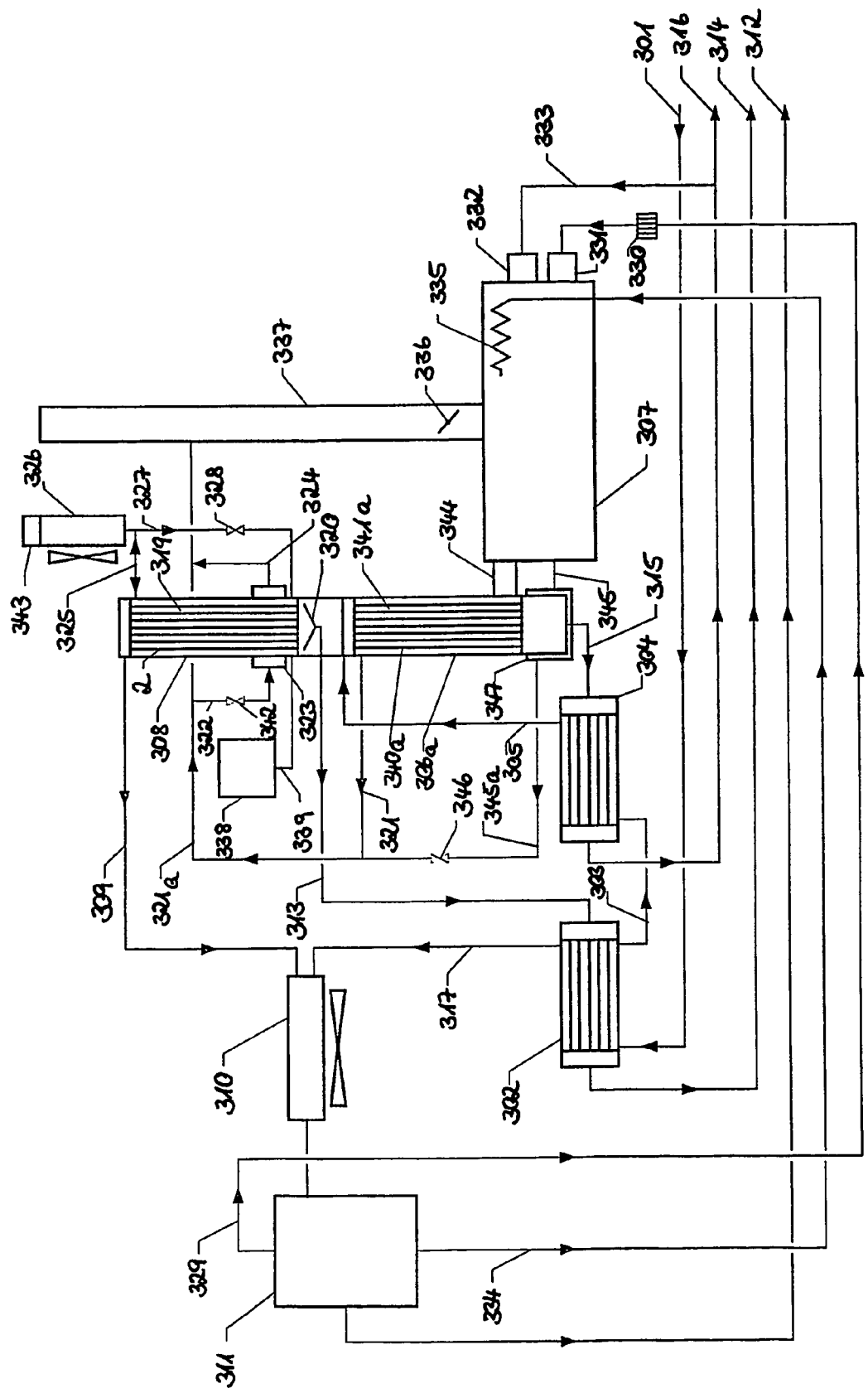

In FIG. 18 the process flow diagram of a column that doesn't have any limitations on productivity is shown.

Figure 19:
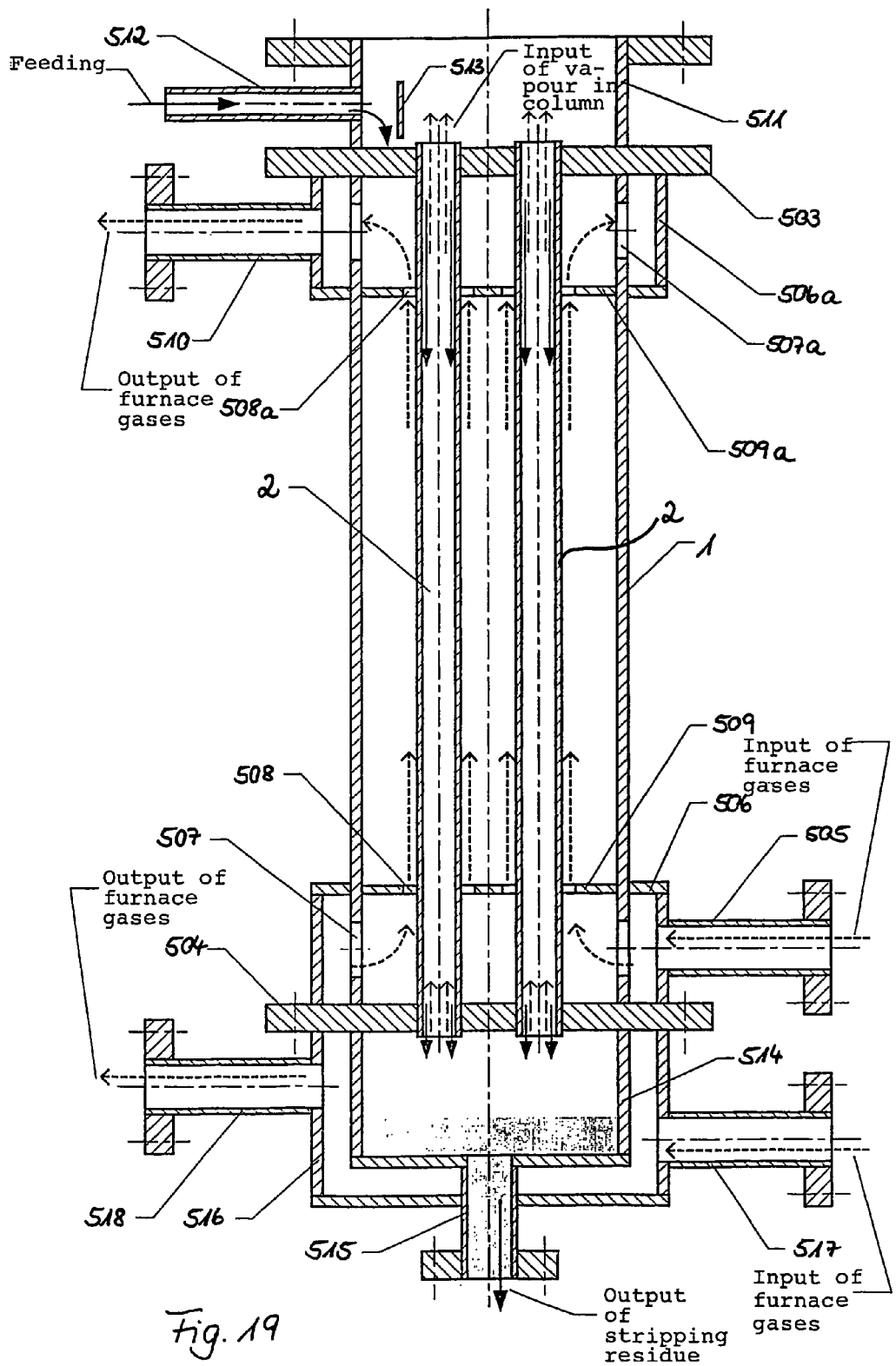

In FIG. 19 the design of the film stripping evaporator is shown.

Figure 20:
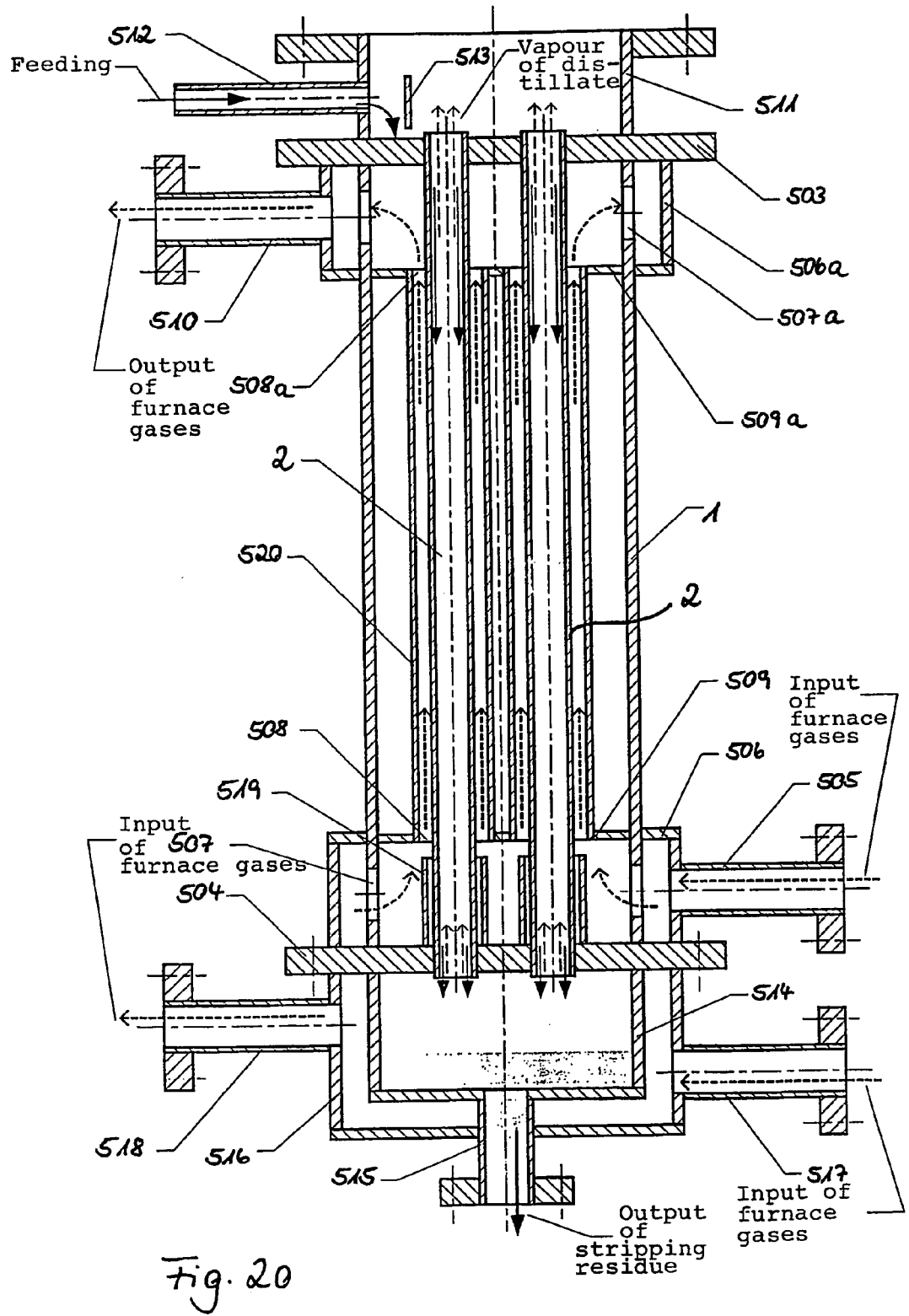

In FIG. 20 another version of the film stripping evaporator is shown.

Figure 21:
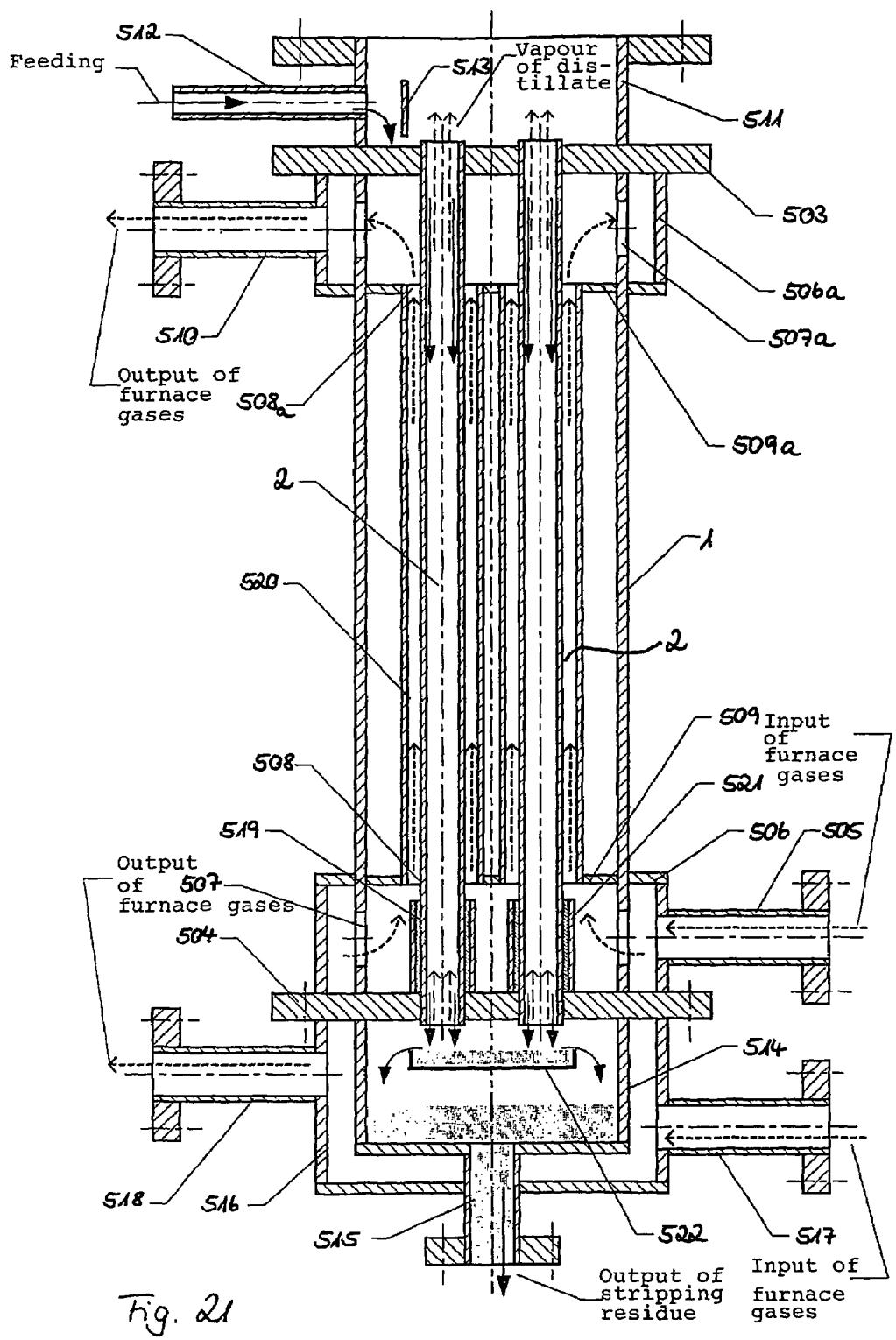

In FIG. 21 a third version of the film stripping evaporator is shown.

DETAILED DESCRIPTION OF THE FIGURES

According to FIG. 7, the column 10 consists of the shell 1 with tube plates 3 and 4, with the heat and mass exchange tubes 2 fixed between them. In the bottom of the rectifying part 12 of column 10 there is a choke 7 (inlet/outlet-pipe) to feed a heat carrier and a choke 6 (inlet-pipe) to return a heat carrier condensate. In the top of the column there is a jet 5 (inlet/outlet-pipe) to bring out a vapor phase of a heat carrier and to return a heat carrier condensate.

The column operates as follows: Through the choke 7 a tubular annulus 100 of the column is filled with a heat carrier. The heat carrier for the rectifying part 12 (section of the column) can be as any liquid or a mixed fluid with the boiling-point in range from the initial mixture boiling-point of the mixture to be rectified to that of the lower-boiling distillate thereof ($T_{B1}$). A heat carrier for the stripping part (section of the column)—being discussed later—can be as any liquid or a mixed fluid with the boiling-point in ranging from the initial to be divided mixture boiling-point up to the boiling-point of the higher-boiling component of the residuum ($T_{B2}$).

The heat carrier boils under the action of the condensation heat of the vapors of the distilled liquid said condensation taking place on the internal wall surfaces of the heat mass exchange tubes 2 or at the expense of the heat input from an external source through the shell 1. The heat carrier vapors go up the tubular annulus 100 and are allocated on a fitting or jet 5 leading into a return condensator (not shown on the fig.). From the return condensator he heat carrier distillate is returned into the tubular annulus of the column through the fitting or 5 and/or through the choke or fitting 6. Thus, leakage of the heat carrier from the column is prevented. The temperature gradient at different heights of the heat and mass exchange tubes 2 is provided with level control of the boiling heat carrier in the column through the choke or fitting 7. Thus the gradient is provided at the expense of the difference of the boiling-point on the height of a hydrostatic fluid column, and at the expense of temperature difference both in vapour and liquid and their distribution along the height of the heat and mass exchange tubes 2.

On the inner surfaces of the tube walls a liquid reflux flow is formed as per the above description. Said liquid reflux flows off the walls of the tubes as a thin film. The vapour of a distilled liquid goes up to the top of tubes 2. Along the height of tubes 2, the heat and mass exchange process occurs between a rising vapor flow and a flowing down film of liquid reflux. The clean vapour phase of distillate of a liquid goes out of the top of the tubes, that is outlet for condensation and cooling. The liquid reflux flow is removed from the column at the bottom of heat and mass exchange tubes 2 and is removed either as a target fraction, or to the lower section of the column, or to the stripping part of the column.

With the purpose of additional regulation of the temperature gradient the return condenser can be equipped with a pressure regulator (not shown on a FIG.), with the means to be used for this being known in industry. Increase or decline of the pressure in tubular annulus 100 changes both the boiling-point of heat carrier, and the temperature gradient between the vapor and the liquid of the heat carrier.

The alternative design of a column, shown in FIG. 8, is similar to the one described above with FIG. 7. It differs—first—in the top of tubular annulus: under the zone of vapors outlet and the return of a heat carrier condensate, there is a distributive tray 8. Second, the heat and mass exchange tubes 2 have a variable wall thickness along their height. In each particular case, the change of wall thickness is determined by the desired profile of the liquid reflux formation, as it was shown by way of example in FIG. 3, 4, 5 or 6. For example, in FIG. 8 there is shown the version with the wall thickness of the heat and mass exchange tube 2 being increased to the bottom end.

The column works as follows: The vapours of the boiling heat carrier go up the tubular annulus 100 and are removed through a fitting or jet 5 into a return condenser, as it was described above. The distillate condensate returns through said fitting 5 and falls on said distributive tray 8. Thus the condensate starts to get warm by a counter-current vapour in a fitting pipe 5 and on a tray 8. A layer of condensate 9 flows through the gaps between the floor of said distributive tray 8 and tubes 2 and flows downwards on the external surface of tubes 2 as a thin film. The flowing down film of the condensate also gets warm by the upward flow of the vapour of the heat carrier. Irregularly along the height of the column, the heat conduction of the walls of the heat and mass exchange tubes 2 provides the origin of the temperature gradient. Again, a (horizontal) temperature gradient is reached—as it was described in the previous version. The condensate part of the heat carrier can also return through a fitting or choke 6. The heat and mass exchange with the inside of tubes 2 in a column occurs similar to the above described version.

The embodiment according to FIGS. 9 and 9a differ from the previous one in that the heat mass exchange tubes 2 have a constant wall thickness along its height. And on the external surface of these tubes 2 there are ribs 15, having variable cross-section along with their height. The temperature gradient for this version is reached at the expense of a heat conduction gradient being supplied by the irregular profile of the ribs along with their height. Some examples for irregular profiles of the ribs are shown in FIG. 10:

a) width of a rib is increased to the bottom.
b) width of a rib is decreased to the bottom.
c) width of a rib is decreased to the middle.
d) width of a rib is nonuniformly increased to the bottom.
e) width of a rib is nonuniformly decreased to the bottom.
f) the heat conduction of a rib is non-uniform along with the height at the expense of different width and depth of slots.
g) the heat conduction of a rib is non-uniform on the height at the expense of different diameter holes, nonuniformly posed on the rib surface. The column operation is similar to the above described versions.

The fourth embodiment, according to FIG. 11, differs from the previous one in that instead of the ribs to achieve the irregular temperature gradient, external tubes 16A are applied, coaxially mounted at a distance in relation to the heat and mass exchange tubes 2. Thus tubes 16A are perforated by holes 11, the quantity of which is distributed nonuniformly along with the height. The irregularity of the temperature gradient along with the height of the heat and mass exchange tubes 2 is reached at the expense of the irregular heat convection conditions of the external surface of the heat and mass exchange tubes 2 along with their height. For example, in FIG. 11 a version with increase of a perforation degree top-down is shown. The running of a column is similar to the above described versions.

The fifth embodiment, according to FIG. 12, is differing from the previous one in that the heat and mass exchange tubes 2 are surrounded at a distance by the coaxially mounted tubes 16B, having irregular inner cross sections (open flow area) along with their heights. In the lower and upper parts of tubes 16B there are holes 11 for the access of a heat carrier to the heat and mass exchange tubes 2 and for the removal of its vapors from the top. The irregularity of a the temperature gradient along with the height of the heat mass exchange tubes 2 is reached at the expense of irregular heat convection conditions from the external surface of tubes 2 along with their height, This irregularity is reached (in particular) at the expense of a velocity gradient of vapors of the heat carrier, flowing around the surface of tubes 2 in a varied gap with tubes 16B. For example, in FIG. 12 a version with decreasing of the open flow area top-down is shown.

The operation of this column is similar to the above described versions.

The sixth design of a column, according to FIG. 13, is similar to the design shown in FIG. 8 and differs from it by that the boiling heat carrier makes use of an external chamber 611. The level of the heat carrier is, preferably, lower than a tube plate 4, The heat carrier in the chamber 611 boils at the expense of the heat input through the walls of the chamber from the external heat source (not shown on the fig.), for example, through a jacket. The chamber 611 is joined to both a tube plate 4 via a fitting or choke 6 and further with the bottom of shell 1 by means of a fitting pipe 610. In the tube plate 4 there is a channel 7B to make the heat carrier condensate pass. The heat carrier vapours go to the tubular annulus 100 of the column through a fitting pipe or choke 6, and the heat carrier condensate returns into the chamber through a channel 7B and fitting pipe 610. The operation of a column is similar to above described versions. The wall thickness of tube 2 decreases form bottom to top—like in FIG. 8.

It is also possible to compose versions which combine the irregular wall thickness of the heat mass exchange tubes 2, the irregular ribs, nonuniformly perforated external casings and/ or external casings of variable cross-section.

Turning now to FIG. 14, a distillation column according to this invention consists of the following main units: a preheater 302, preheater 304, evaporator 306, furnace cavity 307, rectifying column 308, condenser 310, separator 311, return condenser 326.

Example 1

Distillation of Oil of Verkh-Tarskoye Field, Western Siberia

The column works as follows. The oil is previously prepared for distillation as per the standard technology. The crude oil is pumped out of the tanks with the consumption of 1250 kgs/hour and through line 301 moves to the tubular annulus of a shell-and-tube preheater 302. The crude oil temperature is 10° C. From column 308 via line 313 a diesel fuel at the temperature of 250° C. is delivered into the tubular space of preheater 302. Being chilled down to temperature 50° C. the diesel fuel in reverse heats the crude oil up to temperature 60° C. The vapour phase of the heated oil including virgin incondensing gas, is removed directly into condenser 310 from the top of a preheater 302 through line 317. There is another possible version, i. e. of oil delivering into the tubular space of a preheater 302 and of diesel fuel delivering into the tubular annulus of preheater 302.

The fluid phase of heated oil is fed into tubular annulus of a shell-and-tube type preheater 304 through line 303. Black oil at the temperature of 360° C. is fed into tubular space of a preheater 304 from the stripping part of the evaporator 306 through line 315, Being chilled up to temperature 95° C., the black oil in a reverse flow heats the crude oil up to temperature 129° C. It is also possible to feed crude oil into said tubular space of a preheater 304, and to feed the black oil into said tubular annulus.

The heated oil goes to tubular annulus 341 of the initial part of the evaporator 306 through line 305. In the evaporator the oil is heated by hot combustion gases going in a reverse (counter current) flow from a furnace cavity 307 through heating tubes 340. In the final part of the evaporator 306 oil is heated up to 360° C. The feed control of oil is made by the heating temperature in the final part of evaporator 306, which simultaneously is a stripping part of column 308. The light hydrocarbon vapors from the evaporator 306 enter into column 308. The black oil fraction which is heated to 360° C. by the stripping part of evaporator 306 is removed to said preheater 304 for cooling. From the evaporator the flue gases are let out through line 321 in a chimney 337.

In column 308 with heat and mass exchange tubes 350 the process of the heat and mass exchange takes place; as a result of which, the light hydrocarbon vapors are partitioned in a fluid phase of a diesel fuel fraction and a vapour phase of a petrol fraction. The height of the heat mass exchange part of the column 308 is 1.5 meters. The diesel fuel is removed out of the column from a crack tray 320 at the temperature range of 220-270° C. and goes for cooling in said preheater 302. The petrol fraction vapors having a temperature range of 110-120° C., are delivered into condenser 310. In tubular annulus 100 of column 308 the heat carrier boils, providing the high effectiveness of the heat and mass exchange processing tubes, as it was described earlier (FIG. 7-13). As a heat carrier the mixture of extra alcohol's with water is used for example. In a jacket 323 in the bottom of column 308 through line 322 a part of the furnace gases from a line 321 is feed in, transmitting their warmth to the heat carrier in tubular annulus 100. The quantity of the additionally input heat is regulated by a shutter 342. Then the flue gases are removed from jacket 323 through lines 324 and 321 into a chimney 337. In the top of tubular annulus 100 the heat carrier vapours through line 325 are removed into the return condenser 326. The heat carrier condensate returns back into the column through line 325 and/or through line 327. Line 327 can be overlapped partly or completely by means of valve 328. The heat carrier in column 308 is regulated by its input into or removal from tank 338 through line 339. The return condenser 326 intercommunicates with atmosphere through a pressure regulator 343. The regulator 343 provides a constant pressure under atmospheric or heightened pressure in tubular annulus 100. With said pressure variation by means of said regulator 343 a temperature change of the heat carrier in column 308 is provided.

Petrol fraction vapor from the top of column 308 through line 309 are fed into condenser 310. Condensation and cooling down to 30-50° C. of a petrol fraction is made there. The cooled gasoline from condenser 310 goes into separator 311.

In the separator 311 the separation of virgin gas and water condensate from a proceeding petrol fraction is made. From the bottom of separator 311 the water condensate is removed through line 334 to furnace cavity 307 with the consumption of 3 kgs/h. In the furnace cavity the water condensate goes through the coil pipe 335. There the water condensate exhales and is delivered as a vapour into the furnace cavity for firing neutralization of the residual hydrocarbon, keeping in the initial water condensate. The virgin gas from the top of separator 311 is fed through line 329 through the fire-resistant device 330 in burner 331 for liquefaction in a furnace cavity 307. The virgin gas consumption is 48 kgs/hour. The gasoline unbound from water and gas is pumped out of separator 311 through line 312 into tanks with the consumption of 414 kgs/hour.

The cooled diesel fuel from preheater 302 is pumped out through line 314 into tanks with the consumption of 454 kgs/hour. The cooled black oil from a preheater 304 is pumped out through line 316 into tanks with the consumption of 331 kgs/hour.

The furnace cavity 307 has a firing burner 332 and a gas burner 331, using virgin gas for operation. The firing burner is intended for bringing the column into operation, and can be switched off in further operation. This burner can run on diesel fuel or black oil obtained during the column operation. In FIG. 14 the version of running on diesel fuel is shown, which is taken from the column through line 333. Besides that the furnace cavity can be equipped with an alert burner (not shown on the fig.), that provides safety of the process of burning virgin gas. The flue gases from a furnace cavity are fed into heating tubes of the evaporator 306 for heating and vaporization of oil. A part of flue gases with the surplus heat is removed through the chimney 337. The quantity of flue gases required for the evaporator running is regulated by a shutter 336. Residual heat of flue gases let out from the column can be recuperated by the ways known in industry.

Example 2

Distillation of Gas Condensate of Verkh-Tatarskoye Field, Western Siberia

The column scheme is according to FIG. 14a and the column operates as follows: The gas condensate from a tank (not shown in FIG. 14a) is pumped out with the consumption of 1000 kgs/hour through line 301 into the tubular annulus of a shell-and-tube preheater 302. The furnace fuel at the temperature of 220-240° C. is fed into the tubular space of preheater 302 from the evaporator 306 through line 315. Being chilled up to 40° C., the furnace fuel heats in a reverse flow a gas condensate up to temperature 31° C. The vapour phase of the heated gas condensate including the virgin incondensable gas is removed directly from the top of preheater 302 through line 317 into condenser 310. It is also possible to feed the gas condensate into the tubular space of a preheater 302, and to feed the furnace fuel into the tubular annulus.

The heated gas condensate goes through line 305 into tubular annulus 341 of the initial part of evaporator 306. In the evaporator the gas condensate is heated by hot combustion gas going in the reverse flow from a furnace cavity 307 through heating tubes 340. In the final part of evaporator 306 gas condensate is heated to temperature 220-240° C. The feed control of a gas condensate is carried out as per the heating temperature in the final part of evaporator 6, which one is the same time a stripping part of column 8. The light hydrocarbon vapors from evaporator 306 go into column 308, and the furnace fuel fraction heated to 220-240° C. by the stripping part of evaporator 306 is removed in a preheater 302 for cooling. The flue gases are removed from the evaporator through line 321 in a chimney 337.

In column 308 in the heat and mass exchange tubes 2 there is a process of heat and mass exchange, by which the light hydrocarbon vapors are partitioned in a fluid phase, mild fractions of diesel fuel and a vapour phase of a petrol fraction. The height of the heat and mass exchange part of the column is 1.5 meters. The light fraction of diesel fuel returns into evaporator 306 and is removed from it in a structure of a furnace fuel fraction through line 315 into preheater 302 for the subsequent cooling, and petrol fraction vapors having the temperature of 105-115° C. are fed into condenser 310. The column 308 operates as it was described above.

The petrol fraction vapors from the top of column 308 are fed through line 309 into condenser 310. There the condensation and cooling of the petrol fraction up to 30-50° C. is made. The cooled gasoline from condenser 310 goes into separator 311.

In the separator a separation of virgin gas and water condensate from a proceeding petrol fraction is made. From the bottom of separator 311 the water condensate is removed through line 334 into a furnace cavity 307 with the consumption of 2.5 kgs/hour. In the furnace cavity the water condensate passes through the coil pipes 335. There the water condensate exhales and as the vapour is fed into the furnace cavity for firing neutralization of hydrocarbon residuals, kept in the initial water condensate. Virgin gas from the top of separator 311 is fed through line 329 through fire-resistant device 330 in burner 331 to be burnt in a furnace cavity 307. The consumption of virgin gas is 58 kgs/hour. The gasoline unbound from the water and gas, is pumped out of the separator 311 through line 312 into tanks with the consumption of 826.5 kgs/hour.

The cooled furnace fuel from preheater 302 is pumped out through line 314 into tanks with the consumption of 103 kgs/hour.

The furnace cavity 307 operates as it was described above.
In FIG. 15 the design versions of the rectification column 308 (view I, FIGS. 14, 14a) are shown.
   a) to create the biggest temperature gradient along the height of the rectifying column can consist of two or more sections, in each one there is a heat carrier with differing boiling-points.
   b) to select intermediate fractions the rectifying column can consist of two or more sections having trays for the removal of a fraction in the bottom part.
   c) to create the most effective conditions for rectification process, the common flow area of the heat and mass exchange tubes in each subsequent
      section of the column decreases proportionally to the flows of vapor and fluid phases in the column.

The evaporator for the column shown in FIGS. 14, 14a, represents a shell-and-tube heat exchanger (see FIG. 16). At the butt ends of the shell 401 the tube plates 402 and 403 are posed, in which the heating tubes 404 are fixed. The heating tubes are so located that in the top of the shell 401 there is a spare tubular annulus. The mouth 405, intended for connection with the rectifying column, is located on the edge of the evaporator, near the tube plate 402. In the bottom of the shell 401 near the tube plate 402 a fitting 407 to remove the stripping residue is posed. On the opposite side near the tube plate 403 there is a feeding 406 to feed the raw material into the evaporator. The fitting 406 can be placed both in the base of the shell 401 or on the vapour-liquid-boundary layer of the medium (not shown on the fig). The evaporator operates as follows. The raw material, for example oil is fed into the evaporator through the feeding 406 and filled in the tubular annulus, covering the heating tubes. In the top of the evaporator there is a space for vapors passing. In the case that the evaporator is fed with non heated raw material, the fitting is placed in the base. In case of heated raw material which keeps a vapour phase, the feeding 406 is on the vapour-liquid-boundary layer of the medium. The oil goes along the heating tubes 404 in a direction towards mouth 405. From a furnace cavity (not shown in FIG. 16) the hot flue gases go, in the opposite direction through the heating tubes and are then removed from the opposite side of the evaporator in a chimney collector (not shown in FIG. 16). Thus, in the evaporator the reverse-flow (counter current) thermoexchange between oil and flue gases will be realized. As the oil is gently heated during its motion, the light hydrocarbons exhale form it. At the end (at the right side in FIG. 16) of the evaporator the oil is heated up to maximum temperature of the fractions to be selected, so only black oil remains in the area of the tube plate 402 in liquid form. Thus, the final part of the evaporator is at the same time a stripping part of the column. After this the black oil is immediately let out from the evaporator to the fitting 407. The dwell-time of oil at maximum temperature does not exceed some minutes, so that production of carbon at the surface of the heating tubes 404 is excluded. The smoothly varying and uniform rise of the boiling-point of oil promotes the effective extraction of light hydrocarbons fractions. The light hydrocarbon fractions vapors which have evaporated from the oil in the beginning of the evaporator process, move in parallel through the free space of the evaporator in the direction of the oil surface in this column. Thus on their way they meet vapours of higher-boiling fractions. As the result of the interaction of the vapors the stripping of a vapour phase occurs. At the end of the evaporator the vapors go up to the mouth 405 and further into the rectification column.

In FIG. 17 the design version of the evaporator differing by the introducing of the cross-sectional perforated partitions 408 into the vapor space is shown.

These partitions are particulate submersed in a boiling bed of the oil. The hydrocarbon vapours exhaling from the oil pass through the perforated partitions and become turbulized. The transit of hydrocarbon vapors through the perforated partitions promotes increase of efficiency of stripping both on their surface and in the space between them.

The quantity of the heated up oil located in the evaporator is insignificant. For example, the evaporator capacity for the column for a 10,000 tons per year production volume is 400 liters of oil. Since the content of hydrocarbon located in the evaporator and the film column is insignificant, there is an opportunity to unit the column, the evaporator and the furnace cavity in a unified, compact single block without violation of the fire and explosive safety standards. The design of the column introduced on FIGS. 14, 14a allows to create high-performance compact rectification complexes with an output up to 100-150 thousand tons per year based on the processed raw material.

In FIG. 18 the process flow diagram of a column that doesn't have any limitations on productivity is shown. The distinctive feature of the column is a film stripping evaporator 306a. The heated oil is fed through line 305 in the top of the evaporator 306a and flows down as a thin film on the internal walls of the heating tubes 340a. The furnace gases from furnace 307 are fed into the tubular annulus 341 a through a distributing collector 344, and are let out from the evaporator through line 321. The film is heated during its flow downwards. The fractions of light hydrocarbon exhale from it and go to the rectifying column 308, The remained black oil fraction in its liquid state flows off into the stripping part and is removed through line 315 to a preheater 304. The stripping part of the evaporator has a heating jacket 347. A part of flue gases is removed from the furnace cavity 307 through line 345 into the heating jacket 347. The flue gases pass through the jacket 347 and are removed through line 345a. The temperature in the stripping part is regulated by the consumption of gases by means of a shutter 348. The detailed construction and operation procedure of the evaporator will be described below. Apart from that, the column operates in a similar way as the column described above (see FIG. 14).

Usage of the film evaporator allows to lower the content of the heated up oil in comparison to the previous version of the evaporator (see FIG. 16) by 50-100 times. In combination with the film column there is the opportunity to combine the column, evaporator and the furnace cavity in a unified, compact single block without violation of the fire and explosive safety standards.

The design of the column introduced on FIG. 18 allows to create high-performance compact rectification complexes on processing of any raw material (oil, gas condensate or their mixtures or other liquid mixtures) without limitations on productivity.

In FIG. 19 the design of the film stripping evaporator is shown.

The evaporator consists of the vertical shell 1 with tube plates 503 and 504, in between which the heating tubes 2 are fixed. In bottom of the shell 1 the distributive collector 506 with windows 507 is posed. The collector 506 has a fitting pipe 505 for input of flue gases. Above the windows 507, the lower partition 509 with holes 508, and coaxial heating tubes 2 of smaller diameter are posed. In the top of the shell 1 a collector 506a with windows 507a is posed. The collector 506a has a fitting pipe 510 to let out flue gases. Below the windows 507a the upper partition 509a with holes 508a and said coaxial heating tubes 2 are posed. On the top an adapter 511 is attached to the tube plate 503 for connection with the rectifying column. The adapter 511 has a pipe connection 512 to feed the raw material and a deflector 513. To the lower tube plate 504 a cube 514 with a jacket 516 is attached. In the base of the cube there is a pipe connection 515 to pour out the stripping residue. The jacket 516 has a pipe connection 517 for input of flue gases and a pipe connection 518 for output.

The evaporator runs as follows. The raw material, for example oil, is fed through the pipe connection 512 on the surface of the tube plate 503. The deflector 513 provides the distribution of oil on the surface. The oil as a thin film flows off downwards on the internal surface of the heating tubes 2. The flue gases from the furnace cavity on fitting pipe 505 are fed into the collector 506 and are arranged uniformly through windows 507 in the tubular annulus of the shell 1. Through the holes 508 the flue gases go up through the partition 509, for heating the outer surface of heating tubes 2. The holes 508 provide the uniform motion of flue gases along the heating tubes 2. This results in a uniform vertical gradient of temperature along the height of the evaporator. Through the holes 508a and the windows 507a the cooled flue gases are removed from the tubular annulus of the shell 1 into the collector 506a. They are removed further through a fitting pipe 510. As the result of the reverse-flow (counter current) thermo exchange the oil film of oil is heated, and the fractions of light hydrocarbon exhale from it. The hydrocarbon vapors go up along the tube 2 and interact with the flowing off film of liquid. As a result a heat and mass exchange occurs between them. The stripping of oil occurs. The hydrocarbon vapors refined from the higher-boiling fractions leave the top of the heating tubes. From adapter 511 the vapours go into the rectifying column. In the bottom of the heating tubes 2 the oil film is heated up to the maximum temperature of the fractions to be selected, when only the black oil remains in the liquid phase. The film flows off in a cube 514, from where the black oil fraction is removed through the pipe connection 515. A part of flue gases is fed into jacket 516 through the pipe connection 517 to heat the cube 514. From the jacket the flue gases are removed through the pipe connection 518.

Feeding of oil and flue gases is carried out in that way that in the bottom of the heating tubes the heating of the film to the maximum temperature of fractions to be selected is provided. Heating temperature is inspected via the temperature of the black oil in the cube. The dwell-time of oil in the evaporator under the critical temperature does not exceed one minute.

In FIG. 20 another version of the film stripping evaporator is shown.

Its design and operation is similar to the described above. In a zone of input of flue gases from the distributing collector 506 the heating tubes 2 are surrounded by coaxial sockets 519 at a distance. Between the heating tubes 2 and the sockets 519 there is, consequently, an annular gap. The sockets 519 screen the bottom of the heating tubes from the hot furnace gases, thus preventing the danger of cauterizing of the black oil film on the internal surfaces of the down part of the tubes 2. The heating tubes 2 between the partitions 509 and 509a are placed inside coaxial mounted restraining tubes 520, thus providing higher efficiency of the heat transfer from the flue gases to the surface of the heating tubes 2. For further increase of the heat transfer efficiency the heating tubes 2 can have a vertical or horizontal finning (not shown on the fig.).

In FIG. 21 a third version of the film stripping evaporator is shown.

Its design and operation is similar to the described above. The annular gap between sockets 510 and heating tubes 2 is filled by a heat-insulating material or liquidating stuff 521 with the melting-point not exceeding the temperature of decomposing in range from the temperature of decomposing of the base mixture up to the temperature of decomposing of the stripping residue. In case of a sharp jump of the consumption and the temperature of the furnace gases the melting stuff in the gap starts to be fused. Within the melting time of the alloy the temperature in the bottom of the tubes is stabilized, thus providing protection from cauterizing of the black oil film for the control time of the process. Directly under the lower tube plate 504 an additional tray 522 is located. The black oil film flows off into the tray, and then over its edge into the base of cube 514. By introducing this tray, an additional control for the maximum heating temperature of the oil is possible.

An internal space of the heat and mass exchange tube 2 can be partly or completely filled by heat-transfer elements made by the way of spirals, a diameter of which is in the ratio from 1:3 up to 1:5 to a minor (inner) diameter of the heat and mass exchange tube(s), wherein the ratio of the spiral diameter to the spiral length is from 1:1 up to 1:3.

LIST OF REFERENCE NUMBERS 1 shell
2 heat and mass exchange tubes
3 tube plates
4 tube plates
5 jet
6 choke
7 choke
7B channel
8 distributive tray
9 layer of condensate
10 ribs
11 holes
12 rectifying part
13 column
14 stripping part
15 ribs
16A external tubes
16B external tubes
100 tubular annulus
110 column
112 rectifying part
114 stripping part
114A heat and mass exchanging tubes
301 line
302 preheater
303 line
304 preheater
305 line
306 evaporator
306A film stripping evaporator
307 furnace cavity
308 rectifying column
309 line
310 condenser 311 separator
312 line
313 line
314 line
315 line
316 line
317 line
320 crack tray
321 line
322 line
323 jacket
324 line
325 line
326 return condenser
327 line
328 valve
329 line
330 fire-resistant device
331 burner
332 firing burner
333 line
334 line
335 coil-pipe
336 shutter
337 chimney
338 tank
339 line
340 heating tubes
340A heating tubes
341 tubular annulus
341A tubular annulus
342 shutter
343 pressure regulator
344 distributing collector
345 line
345A line
346 shutter
347 heating jacket
348 shutter
401 shell
402 tube plate
403 tube plate
404 heating tubes
405 mouth
406 feeding
407 fitting
408 cross-sectional perforated partitions
503 tube plate
504 tube plate
505 fitting pipe
506 collector
506A collector
507 windows
507A windows
508 holes
508A holes
509 lower partition
509A upper partition
510 fitting pipe
511 adapter
512 pipe connection
513 deflector
514 cube
515 pipe connection
516 jacket
517 pipe connection
518 pipe connection
519 coaxial sockets
520 coaxially mounted restraining tubes
521 heat-insulating material
522 tray
610 fitting pipe
611 external chamber
G vapor flow
h1 height of separation
L liquid reflux flow
P distillate sampling

The invention claimed is:

1. A compact rectifying unit for separation of a mixed fluid, said compact rectifying unit comprising a rectifying tower or column comprising:
a) an outer shell;
b) means for a vapour phase output from the top of the tower or column;
c) means for a fluid phase output from the bottom of the tower or column;
d) tube gratings or plates, between which at least one heat and mass exchange tube of the tower or column is fixed, said tube gratings or plates keeping said heat and mass exchange tube(s) inside of said outer shell;
e) means for evaporating said mixed fluid, said evaporating means comprising means for heating said mixed fluid; wherein:
an internal space of said heat and mass exchange tube(s) is in fluid connection with said evaporator means;
said tube gratings or plates, said heat and mass exchange tubes(s) and said outer shell define a tubular annulus between said outer shell and said heat and mass exchange tubes(s);
the tubular annulus is filled by a fluid heat carrier and its vapours and is connected to a return condensator and to a means for warming said fluid heat carrier;
said rectifying tower or column further comprising means for providing irregular amounts of heat transfer between an inside and an outside of a tube wall along a height of said heat and mass exchange tube(s) between the inside and the outside of said tube wall.

2. A compact rectifying unit according to claim 1, wherein said evaporator means comprises a shell-and-tube heat exchanger, one cavity of which is connected with said annulus and another cavity of which is connected with said means for heating said mixed fluid.

3. A compact rectifying unit according to claim 1, wherein said heating means for heating said mixed fluid comprises a furnace, wherein a jacket of said evaporator means is connected with said furnace.

4. A compact rectifying unit according to claim 1, wherein said warming means for said heat carrier comprises a furnace and a jacket, which is connected with said furnace.

5. A compact rectifying unit according to claim 1, wherein said means for providing irregular heat transfer comprises a level regulator of the fluid heat carrier in said tubular annulus of said rectifying tower.

6. A compact rectifying unit according to claim 1, wherein said return condensator for said heat carrier is supplied with a pressure regulator.

7. A compact rectifying unit according to claim 1, wherein said means for providing said irregular heat transfer comprises the heat and mass exchange tube(s) having along their height walls of variable depth (thickness).

8. A compact rectifying unit according to claim 1, wherein said means for providing said irregular heat transfer comprises plates or edges being posed on said heat mass exchange tube(s) and having variable cross-sections along the height of said heat and mass exchange tube(s).

9. A compact rectifying unit according to claim 1, wherein said means for providing said irregular heat transfer comprises guide tubes posed around said heat and mass exchange tube(s) at a radial distance and being nonuniformly perforated along the height of said heat and mass exchange tube(s).

10. A compact rectifying unit according to claim 1, wherein said means for providing said irregular heat transfer comprises guide tubes posed around said heat and mass exchange tube(s) at a radial distance and having irregular inner cross sections along the height of said heat and mass exchange tube(s), wherein upper and bottom parts of said guide tubes intercommunicate with said tubular annulus.

11. A compact rectifying unit according to claim 1, wherein the internal space of said heat and mass exchange tube(s) is partly or completely filled by heat-transfer elements made by the way of spirals, a diameter of which is in the ratio from 1:3 up to 1:5 to a minor (inner) diameter of the heat and mass exchange tube(s), wherein the ratio of the spiral diameter to the spiral length is from 1:1 up to 1:3.

12. A compact rectifying unit according to claim 5, wherein said level regulator of said fluid heat carrier in said tubular annulus comprises an external tank with a heat carrier connected with the tubular annulus.

13. A compact rectifying unit according to claim 1, wherein said rectifying tower or column is divided into vertical sections with the inner space of the heat and mass exchange tube(s) being connected between the vertical sections.

14. A compact rectifying unit according to claim 13 wherein each section of said rectifying tower or column has its own tubular annulus for the heat carrier.

15. A compact rectifying unit according to claim 13, wherein between said sections there are devices for sampling of intermediate fractions.

16. A compact rectifying unit according to claim 15, wherein an inner cross-section of the heat and mass exchange tube(s) in each section of the rectifying tower or column decreases proportionally to flows of steam and/or fluid phases in the tower or column.

17. A compact rectifying unit according to claim 2, wherein said evaporator means comprises horizontally posed heating tubes, cavities of said heating tubes intercommunicating with a furnace cavity, and a tubular annulus between said heating tubes and said shell intercommunicates with the internal space inside said heat and mass exchange tube(s) of said rectifying tower or column, whereby in a top of said evaporator means there is a free volume.

18. A compact rectifying unit according to claim 17, wherein cross-sectional perforated partitions are placed in said free volume of the top of said evaporator means.

19. A compact rectifying unit according to claim 1, wherein said evaporator means is directly connected with a furnace cavity, and the rectifying tower or column is posed in a zone of the evaporator abutting to a furnace cavity;
an input unit for the mixed fluid being placed on an opposite side of the evaporator means, with respect to the furnace cavity, and an output unit for residuum is posed in a bottom zone of the evaporator means abutting to the furnace cavity.

20. A compact rectifying unit according to claim 2, wherein said evaporator means comprises upright directed heating tubes, cavities of which intercommunicate with the internal space of said heat and mass exchange tube(s) or the tubular annulus of said rectifying tower or column, and the tubular annulus between said heating tubes and said shell intercommunicates with a furnace cavity.

21. A compact rectifying unit according to claim 20 wherein said rectifying tower or column is posed at an upper butt end of said evaporator means, and said furnace cavity is connected with the bottom of said tubular annulus of said evaporator by means of a distributive ring collector.

22. A compact rectifying unit according to claim 21, wherein at a top of the evaporator tubular annulus there is a second ring collector to output the furnace gases.

23. A compact rectifying unit according claim 20, wherein said evaporator means comprises an input unit for the mixed fluid, which is posed above an upper tubular grating of the evaporator means, and an output unit for a residuum is posed under a lower tubular grating, a cavity of which is connected with the furnace cavity.

24. A compact rectifying unit according to claim 22, wherein said distributive ring collector or said second ring collector or both of them comprise an upper or a lower partition respectively with annular, gaps around said heating tube (s).

25. A compact rectifying unit according to claim 24, wherein surfaces of the heating tube(s), located between the lower tubular grating and the lower partition, are surrounded by protective sockets with annular gaps around said heating tubes.

26. A compact rectifying unit according to claim 25, wherein the gaps between said protective sockets and heating tubes are filled with a heat-insulating material.

27. A compact rectifying unit according to claim 25, wherein the gaps between protective sockets and heating tubes are filled with a substance with melting point not superior the temperature of decomposing in range between the temperature of decomposing of the mixed fluid and the temperature of decomposing of the residuum.

28. A compact rectifying unit according to one claim 20, wherein the surfaces of said heating tubes between the lower and upper partitions are surrounded by coaxially posed restraining tubes.

29. A compact rectifying unit according to claim 1, wherein a jacket of a means of heating of the heat carrier is posed on the bottom of the tower or column.

30. A compact rectifying unit according to claim 1, wherein a jacket of a means of heating of the heat carrier contains a tank containing said the heat carrier, the upper level of which tank being below the tower or column.

31. A compact rectifying unit according to claim 1, wherein said heat carrier for the rectifying section of the tower or column being any liquid or mixed fluid with the boiling-point in range from the boiling-point of the initial mixed fluid up to the boiling-point of the lower-boiling component of a distillate.

32. A compact rectifying unit according to claim 1, wherein said heat carrier for a stripping or an evaporation section of said tower or column being any liquid or mixed fluid with the boiling-point in range from the boiling-point of the initial mixed fluid up to the boiling-point of the higher-boiling component of the residuum.

33. A compact evaporator tower or column for a compact rectifying unit that includes evaporator means for evaporating mixed fluids, said evaporator means comprising a shell-and-tube heat exchanger including one cavity connected with a tubular annulus of the evaporator tower or column and another cavity connected with means for heating the mixed fluids, said evaporator means further comprising upright directed heating tubes, cavities of which intercommunicate with an internal space of the heat and mass exchange tubes or the tubular annulus, and wherein an annular space between the heating tubes and a shell intercommunicate with a furnace cavity, wherein said evaporator tower or column comprises heat and mass exchange tubes and means for providing an irregular amount of heat transfer along a height of said heat and mass exchange tubes between an inside and an outside of walls of said tubes.

34. A rectifying process for separation of mixed fluids, said process comprising:
 using a compact rectifying unit for separation of mixed fluids which includes a rectifying tower or column comprising:
 a) an outer shell,
 b) means for a vapour phase output from the top of the tower or column,
 c) means for a fluid phase output from the bottom of the tower or column,
 d) tube gratings or plates, between which at least one heat and mass exchange tube of the tower or column is fixed, said tube gratings or plates keeping said at least one heat and mass exchange tube inside of said outer shell;
 e) means for evaporating said mixed fluid, having means for heating said mixed fluid, wherein:
 an internal space of said at least one heat and mass exchange tube is in fluid connection with said evaporator means;
 said tube gratings or plates, said at least one heat and mass exchange tube and said outer shell define a tubular annulus;
 said method further comprising:
 filling the tubular annulus with a fluid heat carrier and its vapours; and,
 providing an irregular amount of heat transfer along a height of said at least one heat and mass exchange tube between an inside and an outside of a wall of said at least one heat and mass exchange tube.

* * * * *